(12) United States Patent
Kang et al.

(10) Patent No.: US 10,037,143 B2
(45) Date of Patent: Jul. 31, 2018

(54) MEMORY COMPRESSION METHOD OF ELECTRONIC DEVICE AND APPARATUS THEREOF

(71) Applicant: Samsung Electronics Co., Ltd., Suwon-si, Gyeonggi-do (KR)

(72) Inventors: Byoungik Kang, Seoul (KR); Jinyoung Park, Hwaseong-si (KR); Heesub Shin, Yongin-si (KR); Seungwook Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 14/436,344

(22) PCT Filed: Oct. 20, 2014

(86) PCT No.: PCT/KR2014/009849
§ 371 (c)(1),
(2) Date: Apr. 16, 2015

(87) PCT Pub. No.: WO2015/057031
PCT Pub. Date: Apr. 23, 2015

(65) Prior Publication Data
US 2015/0339059 A1     Nov. 26, 2015

(30) Foreign Application Priority Data

Oct. 18, 2013    (KR) ........................ 10-2013-0124885
Oct. 28, 2013    (KR) ........................ 10-2013-0128848

(51) Int. Cl.
*G06F 3/06*      (2006.01)
*G06F 12/02*     (2006.01)

(52) U.S. Cl.
CPC ............ *G06F 3/0608* (2013.01); *G06F 3/061* (2013.01); *G06F 3/064* (2013.01); *G06F 3/0659* (2013.01);
(Continued)

(58) Field of Classification Search
None
See application file for complete search history.

(56) References Cited

U.S. PATENT DOCUMENTS 8,156,306 B1 *   4/2012   Raizen ................. G06F 3/0608
                                                                   707/813
8,364,928 B2     1/2013   Devendra et al.
(Continued)

FOREIGN PATENT DOCUMENTS

| KR | 10-2008-0023846 A | 3/2008 |
| KR | 10-2008-0047096 A | 5/2008 |
| KR | 10-2012-0096749 A | 8/2012 |

*Primary Examiner* — Midys Rojas
*Assistant Examiner* — Khoa D Doan
(74) *Attorney, Agent, or Firm* — Jefferson IP Law, LLP

(57) ABSTRACT

Disclosed are a memory compression method of an electronic device and an apparatus thereof. The method for compressing memory in an electronic device may include: detecting a request for executing the first application; determining whether or not the memory compression is required for the execution of the first application; when the memory compression is required, compressing the memory corresponding to an application in progress in the background of the electronic device; and executing the first application.

14 Claims, 26 Drawing Sheets

(52) U.S. Cl.
    CPC .......... *G06F 3/0673* (2013.01); *G06F 12/023* (2013.01); *G06F 2212/401* (2013.01)

(56) References Cited

U.S. PATENT DOCUMENTS

| | | | |
|---|---|---|---|
| 8,484,405 B2 | 7/2013 | Mashtizadeh et al. | |
| 9,007,239 B1* | 4/2015 | Lissack | G06F 9/4418 341/50 |
| 9,069,615 B2* | 6/2015 | Hackborn | G06F 9/461 |
| 2002/0073298 A1 | 6/2002 | Geiger et al. | |
| 2002/0118307 A1* | 8/2002 | Lee | G06F 12/023 348/714 |
| 2003/0086127 A1* | 5/2003 | Ito | H04N 1/3333 358/462 |
| 2004/0030847 A1 | 2/2004 | Tremaine | |
| 2004/0133661 A1* | 7/2004 | Yoon | G11B 27/105 709/219 |
| 2005/0034129 A1* | 2/2005 | Chew | G06F 9/44594 718/100 |
| 2007/0005911 A1 | 1/2007 | Yang et al. | |
| 2007/0088920 A1 | 4/2007 | Garcia et al. | |
| 2010/0262588 A1 | 10/2010 | Sun | |
| 2012/0072676 A1 | 3/2012 | Accapadi et al. | |
| 2012/0210090 A1* | 8/2012 | Hepkin | G06F 13/16 711/170 |
| 2013/0179659 A1 | 7/2013 | Seo et al. | |
| 2016/0011786 A1* | 1/2016 | Ninose | G06F 3/06 711/103 |

\* cited by examiner (a)

Memory (100)

(b)

Memory (100)

| | CPU | H/W accelerator |
|---|---|---|
| Flexibility | ○ | △ |
| Cost | ○ | △ |
| Compression time | △ | ○ |
| Power reduction | X | ○ |

FIG. 7

| | Single-page compression | Multipage compression |
|---|---|---|
| Implementaion | ○ | X |
| Memory size | ○ | △ |
| Acceleration | X | ○ |
| Power reduction | X | ○ (compressed by H/W accelerator) |

FIG. 8

| | Fixed algorithm | Adaptive algorithm |
|---|---|---|
| Implementaion | ○ | △ |
| Adaptability | X | ○ |

FIG. 17

| | Description | Effect |
|---|---|---|
| Input buffer | CPU copies page to be compressed in input buffer (Virtual RAM disk) | Multipage compression |
| Input buffer size $N$ | CPU is in idle state for $N/\mu$ time | Reduction of power consumption |
| Blocking | While H/W accelerator performs compression, CPU does not store page to be compressed in input buffer | Reduction of interaction between CPU and H/W accelerator [reduction of communication overhead] |
| Multiple buffering | Multiple buffering of input buffer and output buffer | Reduction of Blocking |
| Memory allocation | Input buffer and output buffer are allotted to physically consecutive spaces | No DMA descriptor for H/W accelerator is required [improvement of data transmission speed] |
| Management unit | Perform compression by page unit | It is easy to compress/decompress data by page unit |

MEMORY COMPRESSION METHOD OF ELECTRONIC DEVICE AND APPARATUS THEREOF

TECHNICAL FIELD

This application claims priority under 35 U.S.C. § 119(a) to Korean Application Serial Nos. 10-2013-0124885 & 10-2013-0128848, which were filed in the Korean Intellectual Property Office on Oct. 18, 2013 & Oct. 28, 2013, the entire content of which is hereby incorporated by reference.

BACKGROUND ART

The present invention relates generally to an electronic device, and more particularly, to a memory compression method of an electronic device and an apparatus thereof.

Recently, memory size has increased according to an increase in the complexity of applications. Although the size of a system memory used in an electronic device has increased according to the trend above, it is not sufficient enough to meet the demands for the memory size required by the applications.

One of the methods for securing an available memory space is swapping. The swapping refers to a method by which data is transferred from the memory space to the disk space in order to secure the available memory space. In performing the swapping, the access speed to the disk is normally slower than the access speed to the memory, so the system performance may deteriorate.

In order to address the problem above, a memory compression method may be considered. The memory compression may be used for securing a memory storage space and reducing traffic bandwidth.

However, the memory compression according to the prior art has a trade-off between a service rate and a compression ratio.

DISCLOSURE OF INVENTION

Technical Problem

The present invention provides an effective memory compression method and an apparatus thereof.

More specifically, the present invention provides a method and an apparatus for selectively compressing data corresponding to one or more applications loaded in the memory to effectively secure the available memory space.

In addition, the present invention provides a method and an apparatus for changing a memory compression method depending on circumstances of a system to effectively compress the memory.

Solution to Problem

In accordance with an aspect of the present invention, a method for compressing memory in an electronic device may include: detecting a request for executing the first application; determining whether or not the memory compression is required for the execution of the first application; when the memory compression is required, compressing the memory corresponding to an application in progress in a background of the electronic device; and executing the first application.

In accordance with another aspect of the present invention, an electronic device may include: a memory; and a controller that makes a control to detects a request for executing the first application, to determine whether or not the memory compression is required for the execution of the first application, when the memory compression is required, to compress the memory corresponding to an application in progress in a background of the electronic device, and to execute the first application.

In accordance with another aspect of the present invention, a method for compressing memory may include: identifying system demands for compressing the memory by reflecting the electronic device status; selecting at least one compression element from a compressing performer, a compression unit, and a compression process, which are used for compressing data stored in the memory, based on the identified system demands; and performing the memory compression according to the selected compression element.

In accordance with another aspect of the present invention, an electronic device including a memory may include: a memory that stores data; and a CPU that makes a control to identify system demands, to select at least one compression element from a compressing performer, a compression unit, and a compression process, which are used for compressing data stored in the memory, based on the identified system demands, and to perform the memory compression according to the selected compression element.

In accordance with another aspect of the present invention, a method for compressing memory, in an electronic device in which a plurality of applications are installed and two or more applications can be simultaneously executed, may include: detecting a request for executing the first application; comparing the memory size required for the execution of the first application with the available memory size according to at least one application in progress in a background; and as a result of the comparison, if the memory size required for the execution of the first application is greater than the available memory size, compressing the memory corresponding to the one or more applications in progress in the background.

In accordance with another aspect of the present invention, an electronic device, in which a plurality of applications are installed and two or more applications can be simultaneously executed, may include: a memory; and a controller that makes a control: when a request for executing the first application is detected, to compare the memory size required for the execution of the first application with the available memory size according to at least one application in progress in a background; and as a result of the comparison, if the memory size required for the execution of the first application is greater than the available memory size, to compress the memory corresponding to the at least one application in progress in the background.

Advantageous Effects of Invention

According to an embodiment of the present invention, the data corresponding to one or more applications loaded in the memory is selectively compressed, so the available memory space can be effectively secured. Accordingly, the existing memory can be efficiently utilized without adopting an additional memory, so the electronic device can be manufactured at a low cost by reducing the manufacturing cost. In addition, the disk of which the access speed is slow is ruled out to thereby improve the data loading speed.

In addition, according to an embodiment of the present invention, the memory compression method may be changed depending on system demands to thereby effectively perform the memory compression.

In addition, according to an embodiment of the present invention, the compression performance can be enhanced by improving a service rate and a compression ratio.

BRIEF DESCRIPTION OF THE DRAWINGS

The above and other objects, features and advantages of the present invention will be more apparent from the following detailed description in conjunction with the accompanying drawings, in which:

FIG. 6 illustrates features according to a compressing performer;

FIG. 7 illustrates features according to a compression unit;

FIG. 8 illustrates features according to a compression rule;

FIG. 17 illustrates features of a hardware accelerator-based compression system according to an embodiment of the present invention;

MODE FOR THE INVENTION

Figure 1A:
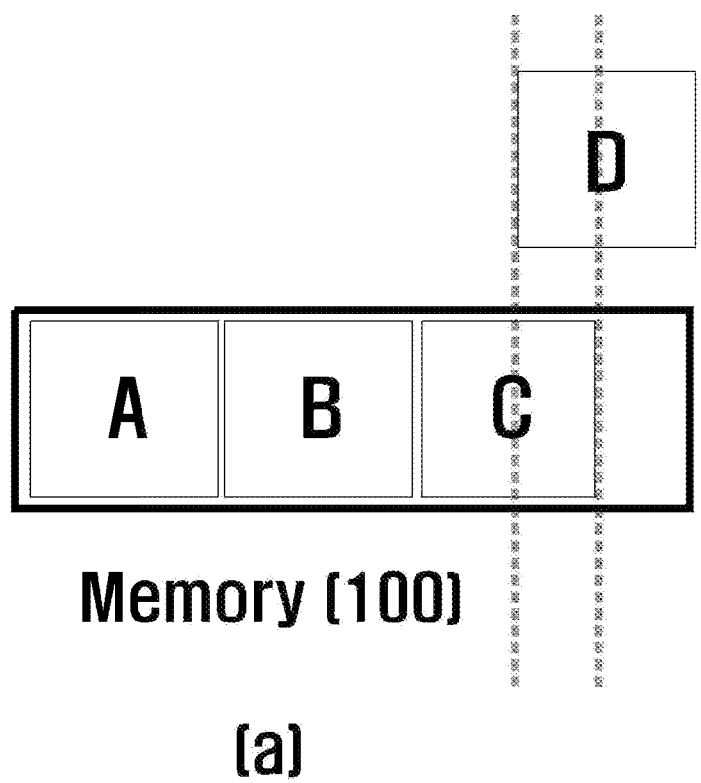
FIG. 1 illustrates a memory compression procedure according to an embodiment of the present invention.

Hereinafter, various embodiments of the present invention will be described in detail with reference to the accompanying drawings. It should be noted that the same elements will be designated by the same reference numerals although they are shown in different drawings. Further, a detailed description of a known function and configuration which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

FIG. 1 illustrates a memory compression procedure according to an embodiment of the present invention.

FIG. 1a shows that the electronic device status has been changed while at least one application is loaded in a memory 100. The electronic device may include mobile devices with mobility, such as smart phones, portable terminals, or the like, but it is not limited thereto. For example, the electronic device may include personal computers, servers, TV sets (e.g., digital TV sets), printers, cameras, or the like.

Although the electronic device status may be changed according to various embodiments as described later, the description of FIG. 1 will be made of the case in which a request for executing a specific application is received.

As shown in FIG. 1a, when a request for executing a specific application is received, data necessary for the execution of the application and data related thereto (hereinafter, application-corresponding data) are loaded in the memory 100, and when the data and the related data are loaded in the memory 100, the requested application may be executed. FIG. 1a shows that the requests for executing applications A, B, and C had been received, and the data necessary for the execution of the applications and the related data have been loaded in the memory 100 to be thereby executed.

In addition, a user request for executing a specific application may be received. In this case, if the memory space is not enough for loading the data necessary for executing the requested application and the related data, or for executing the application, the electronic device according to an embodiment of the present invention may compress the memory 100.

According to an embodiment of the present invention, the electronic device may perform the memory compression at the time of at least one operation of loading the application-corresponding data, or executing the application after loading the same. For example, the electronic device may compress the memory corresponding to the application that satisfies a specific condition, among the applications in progress in a background. In the present invention, to compress the memory may mean that the data of the corresponding application is compressed.

Figure 1B:
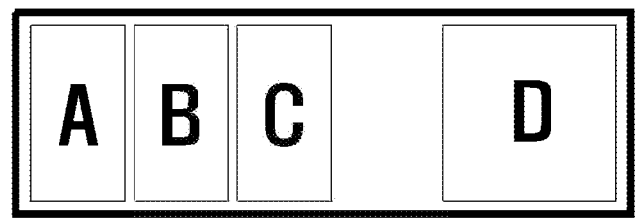

FIG. 1b shows that at least one application has been compressed. Accordingly, an available space for the execution the requested application can be secured.

Subsequently, as shown in FIG. 1b, the electronic device may execute the requested application. In the embodiment of the present invention, to execute the application may mean the operation of loading the application-corresponding data in the memory 100 and executing the same.

Meanwhile, after the memory compressing operation has been carried out in FIG. 1b, another application-execution request may be received. In this case, the operation may be different according to the type of application that is requested for execution. For example, the application requested after the memory compression may include an application that has not been loaded in the memory, an application that has been compressed in the memory, or an application that has been loaded in the memory, but not compressed.

Figure 1C:
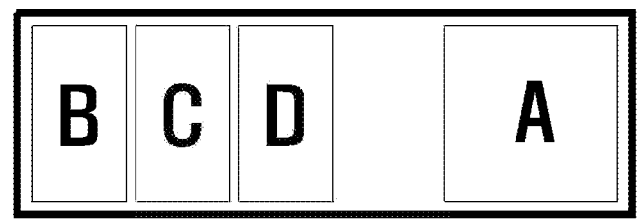

FIG. 1c shows the operation in the case where, after the memory compression through the process above, the request for executing the application corresponding to the compressed memory is received.

As shown in FIG. 1c, after the memory compression, when the request for executing the application (e.g., the application A) corresponding to the compressed memory is received, the compressed memory corresponding to the requested application may be decompressed. Then, since the requested application is in a state of being loaded in the memory 100, the electronic device may execute the requested application.

Alternatively, although not shown in FIG. 1c, after the memory compression, a request for executing a new application may be received. The new application refers to the application that has not been loaded in the memory 100. In this case, the electronic device may determine whether or not the memory compression is required for the execution of the requested new application, and may execute the new application after compressing the memory 100 according to the determination result.

Alternatively, although not shown in FIG. 1c, after the memory compression, a request for executing an application, which has been loaded in the memory 100, but has not been compressed, may be received. In this case, the electronic device may re-execute the requested application.

Meanwhile, FIGS. 1a to 1c show the embodiment in which, in a state in which the data necessary for the execution of a specific application and the related data is loaded, when the request for executing a new application is received, the loaded data is compressed. Meanwhile, according to another embodiment of the present invention, the data that is to be newly loaded in the memory may be compressed. This will be described with reference to FIGS. 1d to 1f.

Figure 1D:
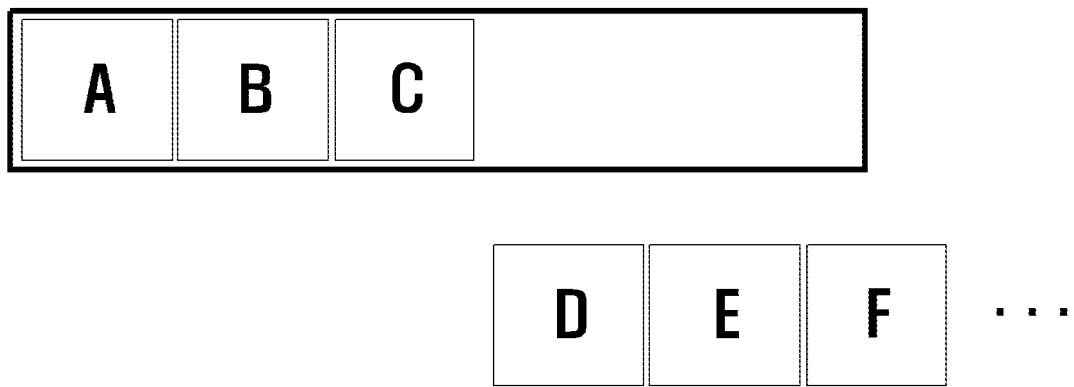
Figure 1E:
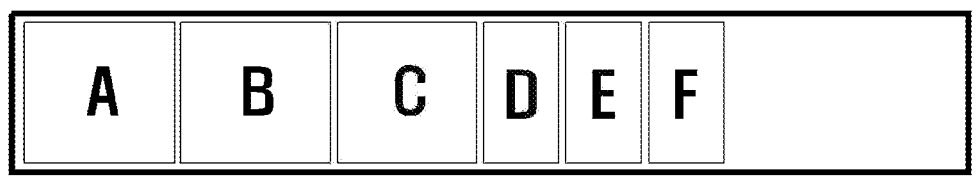
Figure 1F:
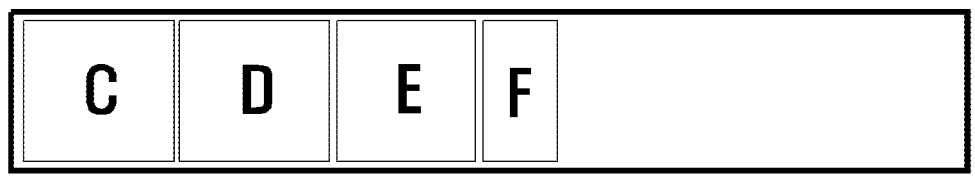

In the embodiment of FIGS. 1d to 1f, the electronic device is a printer, and files to be printed out through the printer are loaded in the memory.

First, as shown in FIG. 1d, files A, B, and C, which are to be printed out through the printer, may be loaded in sequence in the memory. It is assumed that a request for outputting files D, E, and F is received afterwards. In this case, as shown in FIG. 1d, not all of the files D, E, and F can be loaded in the memory.

In this case, the printer may compress the newly requested files D, E, and F, and may load the same in the memory, as shown in FIG. 1e, Afterwards, the printer may decompress the files D, E, and F that have been compressed and loaded in the memory at the right time, for example, when the files A and B have been printed out, and the file C is being printed, as shown in FIG. 1f. The time when the file is decompressed may be determined based on a printing speed of the printer, the size of the file to be printed, a degree of progress in printing, or the like.

The various embodiments above will be described with reference to FIG. 5 later.

Meanwhile, although the applications or the files are explained as the examples of A, B, and C in FIG. 1, the present invention is not limited thereto. The examples A, B, and C may include some object that occupies the memory. The object may include screen configuration information of the electronic device, user interfaces (UI), raw files, or the like.

Figure 2:
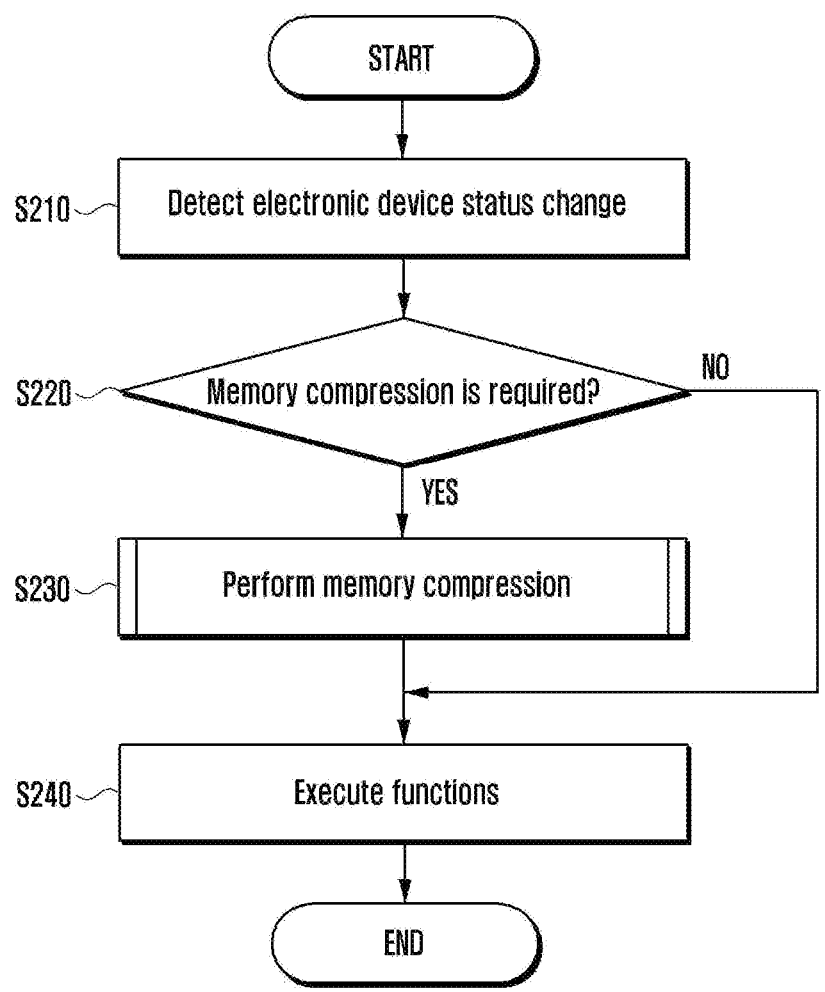
FIG. 2 illustrates a flowchart in which an electronic device performs the memory compression according to an embodiment of the present invention.

FIG. 2 illustrates a flowchart in which an electronic device compresses the memory according to an embodiment of the present invention.

First, the electronic device may detect a change in the electronic device status in operation S210. In addition, the electronic device may determine whether or not the memory compression is required based on the detected change status. Hereinafter, a condition for beginning determination on the necessity of the memory compression will be described.

For example, when a request for executing or terminating some application is received, the electronic device may determine whether or not the memory compression is required. For example, when the application-execution request is received, it is preferable for the electronic device to secure the available space as much as possible to execute the requested application.

In addition to the detection of the request for executing and terminating the application, when a button-click event is detected, the electronic device may determine whether or not the memory compression is required. The button may include a physical button, or a software button, and may further include a volume button, a wake-up/sleep button (or power button), a home button, or the like. For example, when a home button click is detected, the application in progress in the main screen image should be converted into a background layer, so the application in progress in the main screen image may be selected to be compressed. In addition, the electronic device may check whether or not the memory compression is required periodically in a predetermined period. For example, the electronic device may identify the memory status (e.g., the available space) in a predetermined period, and may periodically determine whether or not the memory compression is required.

In addition, the electronic device may determine the necessity of the memory compression when a CPU switches from an idle state to an active state, and vice versa. In addition, the electronic device may determine the necessity of the memory compression in the case of beginning a call, terminating a call, displaying a pop-up message (call, alarm, SMS, or the like), detecting a touch input, detecting the use of an electronic pen or the proximity thereof, detecting the use of short-range wireless communication, such as, Bluetooth, detecting access to the Internet, or the like.

In addition, the electronic device may determine the necessity of the memory compression in the case of detecting an input (or an instruction) for converting the screen image of the electronic device, detecting an input for refreshing the screen image, detecting an input for transforming a 2D UI displayed in the electronic device into a 3D UI, detecting an input for rotating the screen image displayed in the electronic device, or the like.

The electronic device may determine the necessity of the memory compression, based on the factors set forth above.

According to this, the electronic device may proceed to operation S220 to determine whether or not the memory compression is required. For example, if the available memory space is equal to or less than a predetermined reference value, the electronic device may determine that the memory compression is needed. In addition, if the number of applications in progress in the background is more than a predetermined value, the electronic device may determine that the memory compression is needed as well. In addition, if an application that has not been used for a specific amount of time exists in the background, if a specific application that has been configured by the user exists in the background, or if an application that is seldom used exists in the background, the electronic device may determine that the memory compression is needed. In addition, if the memory size required for the requested application is greater than the available memory size according to the current applications existing in the background, the electronic device may determine that the memory compression is required. In addition, if the memory required for the requested application is not secured due to the memory that is occupied by the data corresponding to the current applications existing in the background, the electronic device may determine that the memory compression is required.

As a result of the determination in operation S220, when it is determined that the memory compression is required, the electronic device may proceed to operation S230 to perform the memory compression. For example, the electronic device may compress the memory corresponding to the application in progress in the background. This may mean that the data according to the running application in the background (e.g., stored image data in the case of a camera application) is compressed.

The memory compression in operation S230 will be described in detail later.

After the memory compression, the electronic device may proceed to operation S240 to thereby perform a corresponding function. For example, the requested application may be executed.

Meanwhile, as a result of the determination in operation S220, when it is determined that the memory compression is not required, the electronic device may proceed to operation S240 to perform the corresponding function.

Meanwhile, although the corresponding function is executed after the memory compression, the operation is not limited to such a sequence. For example, the electronic device may return to operation S220 after the memory compression in operation S230 to determine the necessity of the memory compression again. As a result of the determination, when the memory compression is required, the electronic device may repeat operation S230 to compress the memory.

In addition, in the description of FIG. 2, although the electronic device determines the necessity of the memory compression after detecting the status change of the electronic device, and if necessary, compresses the memory, the present invention is not limited thereto. For example, when the status change of the electronic device is detected, the electronic device may not determine the necessity of the memory compression, but may directly perform the memory compression. For example, the electronic device may promptly compress the memory upon the receipt of the application-execution request.

Figure 3:
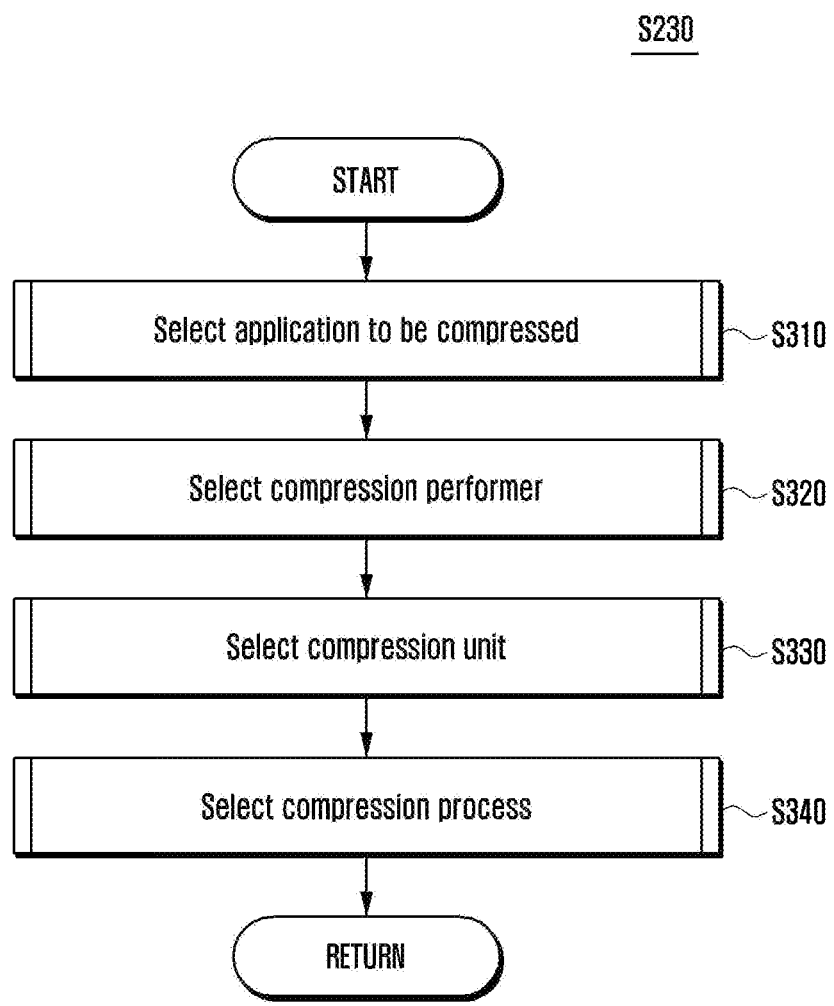
FIG. 3 illustrates a flowchart in which an electronic device performs the memory compression according to an embodiment of the present invention.

FIG. 3 illustrates a flowchart in which an electronic device compresses the memory according to an embodiment of the present invention.

As shown in FIG. 3, the electronic device may select the application to be compressed in operation S310. For example, the electronic device may select all of the applications in progress in the background as the applications to be compressed, or may select at least one application from among the applications in the background as the application to be compressed.

In addition, the electronic device may select a compressing performer in operation S320. According to an embodiment of the present invention, in compressing the memory, a CPU or a hardware accelerator may selectively compress the memory.

When the compressing performer is decided, the electronic device may select a compression unit in operation S330. According to an embodiment of the present invention, the memory compression may be conducted by a single-page unit or by a multi-page unit.

When the compression unit is decided, the electronic device may proceed to operation S340 to perform the compressing process according to an embodiment of the present invention.

The operation of FIG. 3 will be described in more detail with reference to the drawings later.

Figure 4:
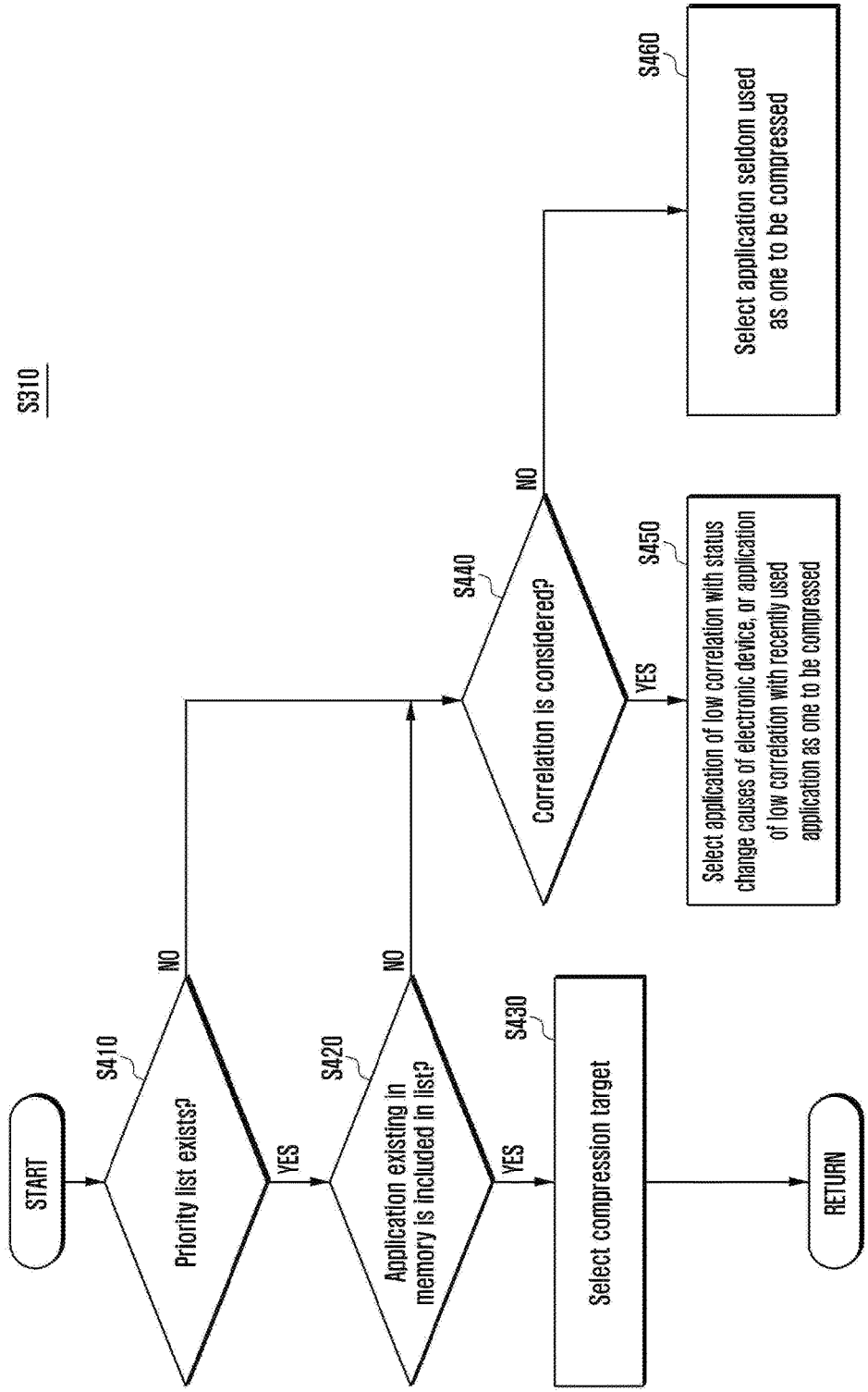
FIG. 4 is a detailed flowchart illustrating the operation S310 of FIG. 3, i.e., the operation of selecting an application to be compressed according to an embodiment of the present invention.

FIG. 4 is a detailed flowchart illustrating the operation S310, i.e., the operation of selecting the application to be compressed, of FIG. 3 according to an embodiment of the present invention.

First, the electronic device may determine whether or not there is a priority list for the memory compression in operation S410. The applications included in the priority list may be prioritized in the memory compression.

If there is a priority list, the electronic device may proceed to operation S420 to determine whether or not at least one of the applications included in the priority list exists in the memory or is in progress in the background. When at least one of the applications included in the priority list exists in the memory or is in progress in the background, the electronic device may select the corresponding application as one to be compressed. That is, the electronic device may select the memory corresponding to the application as one to be compressed.

Meanwhile, if the applications included in the priority list do not exist in the memory or are not in progress in the background in operation S420, the electronic device may proceed to operation S440 to determine whether or not the correlation is to be considered in selecting the application to be compressed. The correlation refers to the relationship with the causes of a change in the electronic device status or recently used applications, which will be described below.

In consideration of the correlation, the electronic device may to proceed to operation S450 to select the application that has a low correlation with the causes of a change in the electronic device status, or the application that has a low correlation with the recently used application as one to be compressed. For example, when a camera application is executed, the electronic device may select a financial application that has a low correlation with the camera as the application to be compressed because the camera has nothing to do with a financial service.

Likewise, in the case where the recently used application is the camera application, the electronic device may determine that an SNS application has a high correlation with the camera application because the user is likely to upload images taken using the camera application to an SNS, whereas the electronic device may determine that the financial service application has a low correlation with the camera application. According to the determination result, if the recently used application is the camera application, the electronic device may select the financial application as one to be compressed.

Meanwhile, in the case of not considering the correlation, the electronic device may proceed to operation S460 to select an application that is seldom used as one to be compressed.

According to the embodiment of FIG. 4, although the electronic device considers the priority list, the correlation, and the frequency of use in sequence, the present invention is not limited to such a sequence. For example, the electronic device may select at least one application according to at least one of the priority list, the correlation, and the frequency of use, and there may be various modifications in the combination or the sequence thereof.

Figure 5:
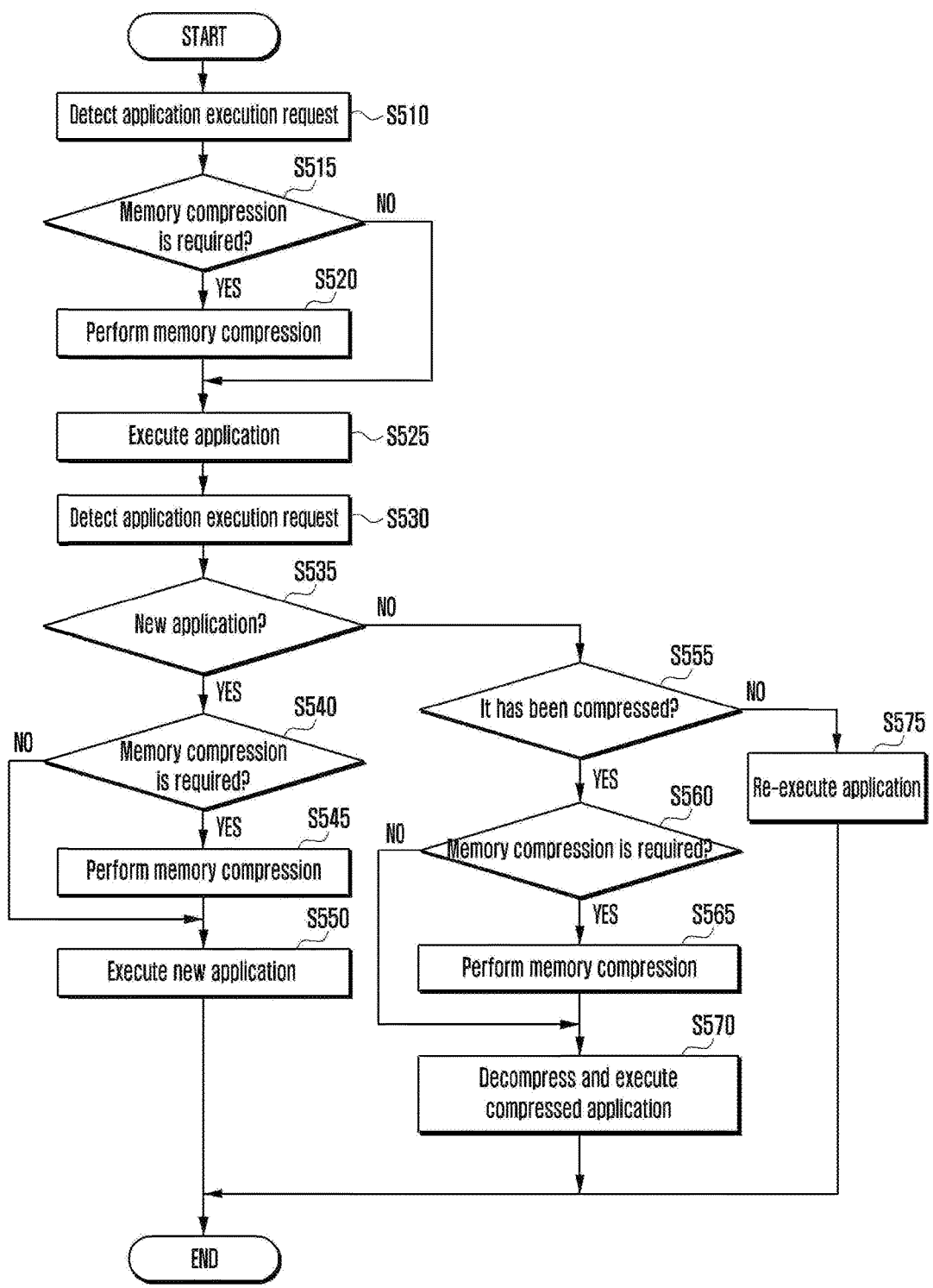
FIG. 5 is a flowchart illustrating one of various embodiments of the present invention.

FIG. 5 is a flowchart illustrating one of various embodiments of the present invention.

More specifically, FIG. 5 shows that the electronic device compresses the memory as needed in the case where the status change of the electronic device, as mentioned in FIG. 2, corresponds to the detection of the application-execution request, and after that, another application-execution request is detected. In FIG. 5, the description that has been made in relation to FIG. 2 will be omitted.

First, the electronic device may detect the receipt of the application-execution request in operation S510. Then, the electronic device may determine whether or not the memory compression is required in operation S515.

If the memory compression is required, the electronic device may proceed to operation S520 to compress the memory. After the memory compression or when the memory compression is not required, the electronic device may proceed to operation S525 to execute the requested application.

Next, the electronic device may detect another application-execution request in operation S530. Then, the electronic device may determine whether or not the requested application is a new application, that is, the requested application is not loaded in the memory or not in progress in the background, in operation S535.

If the request relates to a new application, the electronic device may proceed to operation S540 to determine whether or not the memory compression is needed. For example, the electronic device may determine the necessity of memory compression by comparing the memory size necessary for the new application with the currently available memory size. Alternatively, the electronic device may determine the necessity of memory compression according to at least one of the determination conditions set forth in operation S220 of FIG. 2.

If the memory compression is needed, the electronic device may proceed to operation S545 to compress the memory. The detailed operation of the memory compression has been described in operation S230 of FIG. 2, so it will be omitted here. After the memory compression, the electronic device may proceed to operation S550 to execute the requested application.

Meanwhile, if the memory compression is not needed in operation S540, the electronic device may proceed to operation S550 to execute the requested application.

Meanwhile, if the request does not relate to a new application in operation S535, the electronic device may proceed to operation S555 to determine whether or not the requested application is the compressed application in the memory.

The determination of the necessity of memory compression has been described in operation S540, so the detailed description will be omitted here. If the memory compression is required, the electronic device may proceed to operation S565 to compress the memory. In addition, since the requested application is the compressed application, the electronic device may proceed to operation S570 to decompress the application for execution.

Meanwhile, if the memory compression is not required in operation S560, the electronic device may perform operation S570.

Meanwhile, if the requested application is not the compressed application as a result of the determination in operation S555, the electronic device may proceed to operation S575 to re-execute the requested application.

Hereinafter, operations S320 to S340 of FIG. 3 will be described in detail.

Until now, the operation of selecting the application to be compressed was described, then hereinafter a description will be made of the operation of effectively compressing the memory or the application selected as a target to be compressed.

First, the embodiment of the present invention provides a method by which the memory is compressed using a proper compressing method according to the system demands to thereby improve the system performance. More specifically, as set forth in FIG. 3, a compressing performer that compresses the memory, a compression unit, and a compression algorithm may be selected according to the system demands.

Hereinafter, factors that should be taken into account in selecting the compression method and features thereof will be described with reference to FIGS. 6 to 8. More specifically, FIG. 6 shows features according to a compressing performer, and the FIG. 7 and FIG. 8 show features according to a compression unit and a compression type, respectively.

First, referring to FIG. 6, the features of a CPU as the compressing performer are compared with those of a hardware (H/W) accelerator. The present embodiment provides a method for selectively using the CPU and the hardware accelerator as the compressing performer according to the system demands. Using the CPU as the memory compression is more effective than using the hardware accelerator in terms of the flexibility and the cost of the system. On the contrary, the memory compression by the hardware accelerator can reduce the compression time and power consumption, compared to the CPU. The hardware accelerator provided in the present embodiment may be an element for compressing the memory other than the CPU. In addition, the hardware accelerator may be an element dedicated for the compression.

In general, the CPU has a better flexibility than the hardware accelerator. The hardware accelerator is suitable for predetermined works, but it is difficult for the hardware accelerator to add or change algorithms according to the system demands. For example, in the case where a new compression algorithm is required to be applied, the CPU can easily reflect the algorithm by changing/adding software, but the hardware accelerator hardly reflect the same. Accordingly, the CPU may be better for a high flexibility required.

The hardware accelerator should be separately designed based on the SoC of the existing CPU at an additional cost. Therefore, in order to avoid the additional cost, or when the hardware accelerator does not exist in the SoC in some cases, the CPU is better for use.

Referring to FIG. 7, the features of a single-page compression are compared with those of a multi-page compression method as the compression unit. The embodiment of the present invention provides a method of selectively using the single-page compression or the multi-page compression as the compression unit according to the system demands. The single-page compression can be easily implemented and can reduce the memory size at a high compression ratio, compared to the multi-page compression. On the contrary, the multi-page compression can compress the memory at a high acceleration, and can reduce power consumption.

Referring to FIG. 8, the features of a fixed algorithm are compared with those of an adaptive algorithm as the compression type. The embodiment of the present invention provides a method of changing the compression algorithm according to the system demands and compressing the memory using the same. The fixed algorithm is superior in the compression ability, and the adaptive algorithm is superior in the adaptability.

Until now, the methods for compressing the memory and features thereof have been described with reference to FIGS. 6 to 8. Therefore, the system performance can be improved by using an adequate compression method according to the system.

Figure 9:
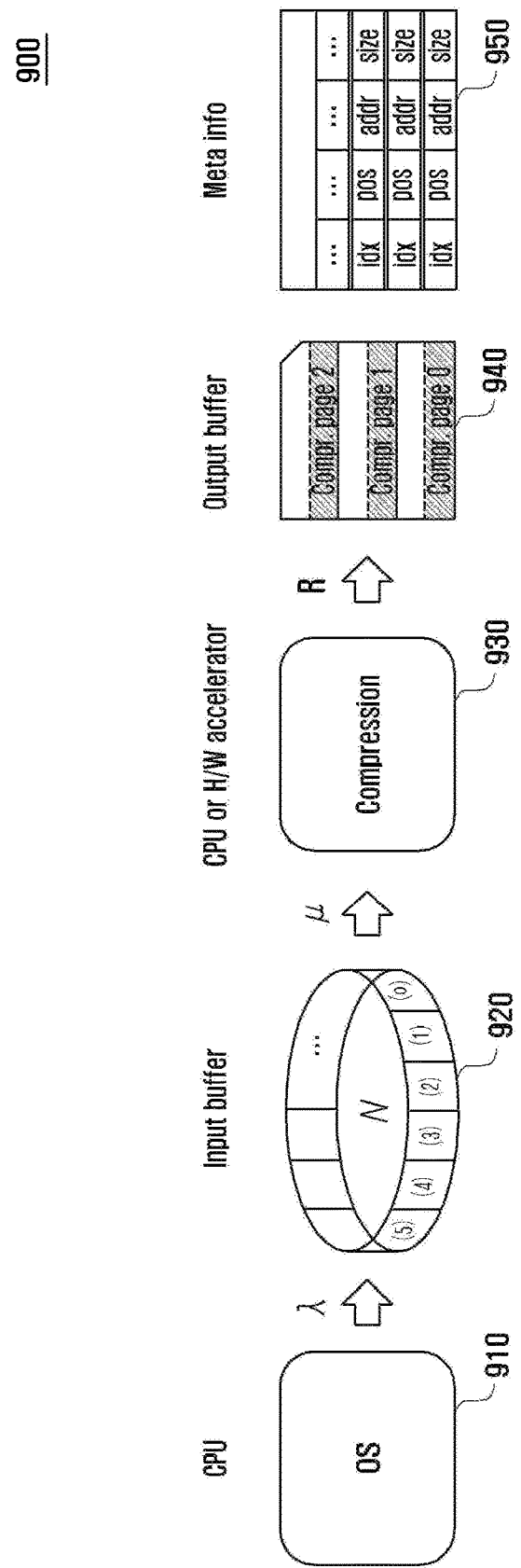
FIG. 9 illustrates a memory compressing apparatus and the operation thereof according to an embodiment of the present invention.

FIG. 9 illustrates a memory compressing apparatus and the operation thereof according to an embodiment of the present invention.

Referring to FIG. 9, the memory compressing apparatus 900, according to an embodiment of the present invention, may include a CPU 910, an input buffer 920 for storing the pages to be compressed, a memory compressor 930, a output buffer 940 for storing the compressed pages, and a compression information storage space (Meta info) 950 for storing compression information on the pages to be compressed or the compressed pages. N denotes the input buffer size. $\lambda$ is an index for an arrival rate, which means an average speed at which the pages to be compressed are generated from the OS. $\mu$ is an index for a compression service rate, which means an average service rate. The service rate may be configured in each page. R is an index for a compression ratio, which means an average compression ratio. The average compression ratio may be based on each page. The system demands mentioned in the description may include features of applications, the available memory size, the memory size to be secured, a required service rate/compression ratio/power consumption/latency, the CPU operation status, the battery status, the traffic status, or the like. The embodiment of the present invention provides a method for changing the compression method according to the system demands.

More specifically for the elements, in general, the operating system (OS) divides the memory space into pieces of a specific size, which is called a page, for management, and the size may vary with the systems. The term "page" in the present invention refers to a memory management unit that may vary with the systems.

The input buffer 920 may be a space for storing the pages to be compressed, which is a kind of virtual RAM disk. In addition, the input buffer size "N" refers to the number of pages to be stored, which may be variable. The output buffer 940 may be a space for storing the compressed result by a page unit, and the size thereof may vary depending on the input buffer size N.

The compression information storage space (Meta Info) 950 may be a space for storing information on the pages, which can be managed by means of an intrinsic index for separating the pages to be compressed from the compressed pages. In addition, the compression information storage space may include the position of a buffer in which a corresponding page is stored, as well as an address of the position in the buffer. It may include a size for the compressed pages.

The arrival rate ($\lambda$), the service rate ($\mu$), and the compression ratio (R) may vary with the system demands. In addition, the service rate ($\mu$), and the compression ratio (R) of the pages may vary depending on a pattern of the page to be compressed and the compression algorithms. The arrival rate ($\lambda$), the service rate ($\mu$), and the compression ratio (R) are shown in the drawing.

Meanwhile, according to an embodiment of the present invention, a compression element for at least one of the compressing performer, the compression unit, and the compression process type may be selected, which are used in compressing the memory, based on the system demands. The system demands may be based on the electronic device status. For example, if the remaining battery power is less than a predetermined value, the system demands for the memory compression may be configured so that the compressing performer of low power consumption may compress the memory.

To sum up, the system demands according to an embodiment of the present invention, may be defined as at least one item that should be considered for the memory compression, reflecting the electronic device status. In addition, the system demands may be reflected in selecting the compression element.

The system demands may be necessary for the application in progress, or the application to be executed (or requested to be executed) in the future. The system demands may include various items as follows. For example, the system demands may include a user operation scenario, the task execution status in the multi-tasking environment, features of applications, the available memory size, the memory size to be secured through the memory compression, the required service rate, the compression ratio, power consumption, latency, the CPU operation status, the battery status, the traffic status, or the like.

The available memory size may vary with the user operation scenario. For example, the operation of taking photos using a camera and transmitting the same through the SNS may require the more memory than a standby mode of smart phones, so the available memory size may decrease relatively in the former. The decrease in the available memory will require the memory compression to secure the available memory.

The memory size that can be compressed may vary according to the task execution status in the multi-tasking environment. The memory space that was occupied by the task in the background is no longer used, so the memory may be compressed. Accordingly, the more the tasks in the background are, the bigger the compressible memory size is. This may influence the determination of the memory service rate. That is, since the memory size to be compressed is big, the memory may be compressed at a high service rate.

The memory size and the data pattern may be different according to the features of the application. The application that uses a simple data pattern, such as a text document that has a high compression ratio, may be selected as one to be compressed, but otherwise it may be excluded from the compression.

The available memory size is the size to which the memory can be used. As the available memory size decreases, the operation of the application may become slow to bring about user inconvenience. Therefore, when the available memory size decreases below a predetermined value, the memory compression may be performed.

The meaning of the memory size to be secured will be described as follows. For example, it is assumed that the request for executing the camera application is received, and the execution of the camera application requires 100 Mega Bytes (MB). In addition, the currently available memory of the electronic device is only 50 MB. In this case, another memory of 50 MB is required for the execution of the camera application, and thus this may be the memory size to be secured through the memory compression.

The required service rate, the compression ratio, the power consumption, and the latency refer to the meaning, respectively, as follows. The service rate means a compressing operation speed, and the compression ratio is an index for the compression efficiency, for example, wherein the compression ratio of 75% means that the original size is reduced by ¾. In general, the service rate is inversely proportional to the compression ratio. Therefore, an adequate compression method should be selected considering the relationship between the service rate and the compression ratio. In addition, in the case where low power consumption is required, the compressing performer of low power consumption may be selected.

In addition, the latency means how fast the result of the memory compression comes out, which is different from the service rate.

For example, if one page is compressed and the result thereof comes out 1 second later in the single-page compression, the latency is 1 second, and the service rate is 1 page/sec. On the contrary, if ten pages are compressed and the result thereof comes out 5 seconds later in the multi-page compression, the latency is 5 seconds, and the service rate is 2 pages/sec. In this example, the single-page compression is shorter than the multi-page compression in the latency, whereas the single-page compression is slower than the multi-page compression in the service rate.

As described above, the unit by which the memory is compressed may be determined according to the required latency.

The compressing performer may be selected according to the CPU operation status. For example, the CPU in a busy state may perform the memory compression, but when the CPU is in an idle state, a separate device rather than the CPU may compress the memory.

The compressing performer may be selected according to the battery status. For example, the remaining battery power is less than 20%, the compressing performer of low power consumption may be selected.

The compressing performer or the compression unit may be selected according to the traffic status. In the case of a heavy traffic, it is preferable to minimize the traffic resulting from the compression. When the compressing performer is a separate device other than the CPU, the data to be compressed is to be transferred from the CPU to the separate device, which causes an increase in the traffic. In addition, in the case of a large compression unit, since the size of the compressed data to be transferred at one time is big, the traffic may increase. In this case, in order to minimize the increase in the traffic, the CPU may be selected as the compressing performer, and the compression unit may be selected as a small one.

Meanwhile, the system demands are not fixed and may be variable. For example, the available memory size may be affected according to the type of application in progress or the number thereof, and the compressible memory size may vary with the task execution status in the multi-tasking environment. In addition, the features of the application in progress may affect the required memory size and the data pattern, which may influence the compression performance. As set forth above, since the operation of the electronic device is variable, the system demands based on the electronic device status may be variable too.

Meanwhile, the memory compressor 930 may compress the pages in a predetermined manner regardless of the system demands. In this case, the multi-page compression based on the memory compressor 930 may be performed according to a predetermined method as follows.

The memory compressor 930 may use a compression algorithm of a ZIP regard to a page of 4 KB, the input buffer 920 may store 256 pages. The size of the output buffer 940 may be determined according to the size of the input buffer 920, and the meta information (Meta Info) may be determined in the same manner. For example, the size of the output buffer 940 may be determined as the same as that of the input buffer 920, i.e., 1 MB, and the meta information may be determined as 32 Bytes×256=8 KB.

If the pages stored in the input buffer 920 exceed a predefined threshold, the CPU 910 may send a control command to instruct the memory compressor 930 to start the compressing operation. The memory compressor 930 that has received the control command may compress the memory, and then inform the CPU that the memory compression is completed using, for example, an interrupt/polling method.

Figure 10:
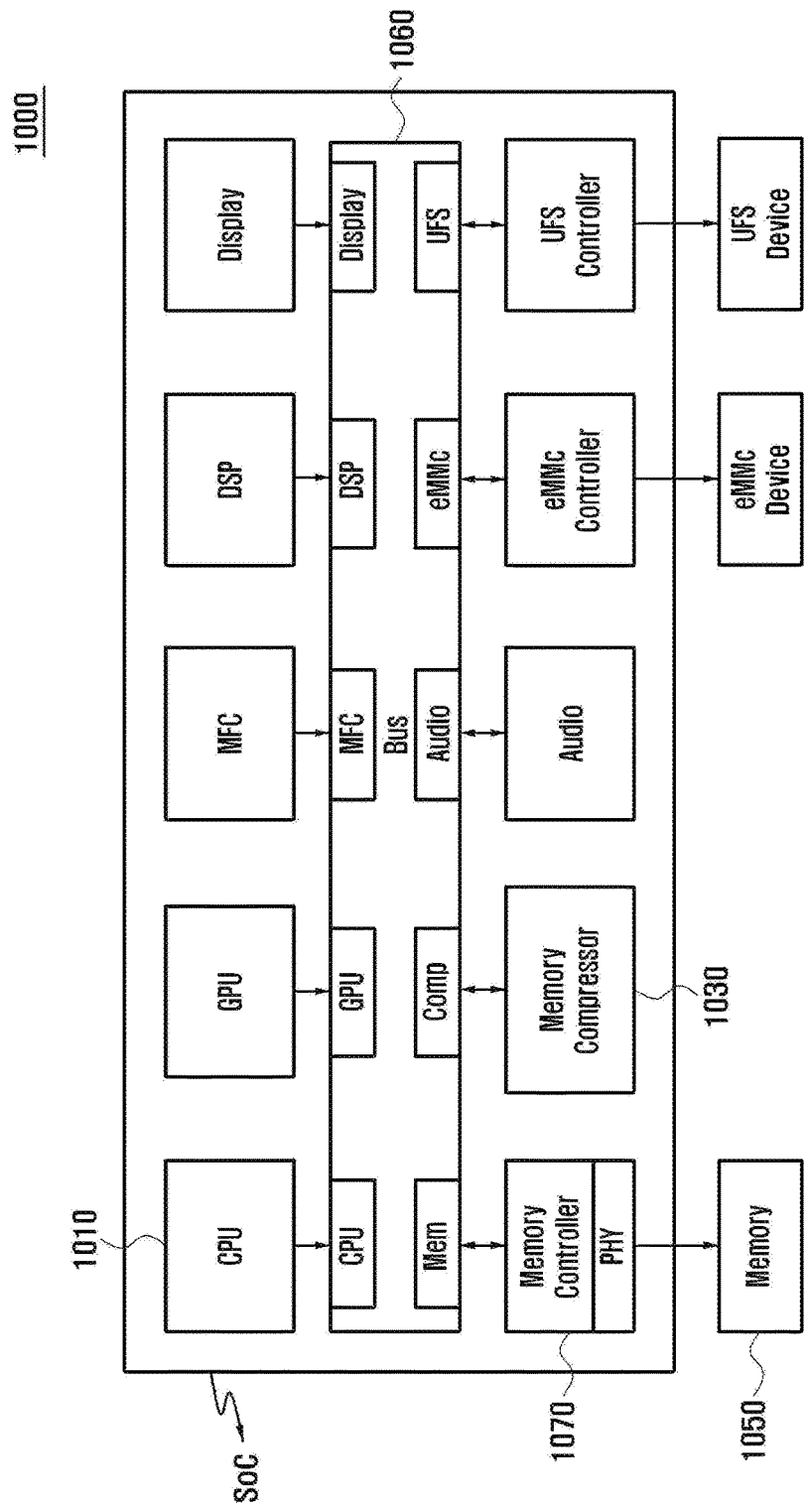
FIGS. 10 to 12 illustrate various embodiments of a system-on-chip (SoC) structure for hardware accelerator-based memory compression according to an embodiment of the present invention.
Figure 11:
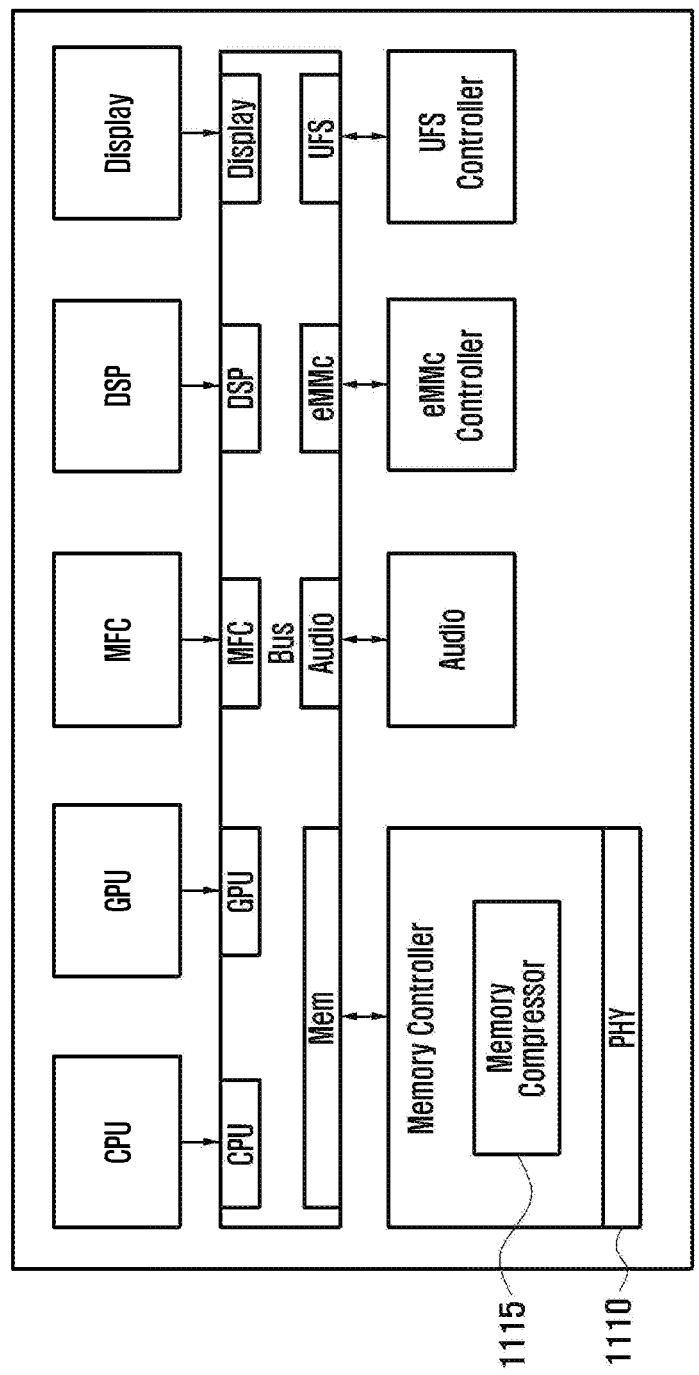
Figure 12:
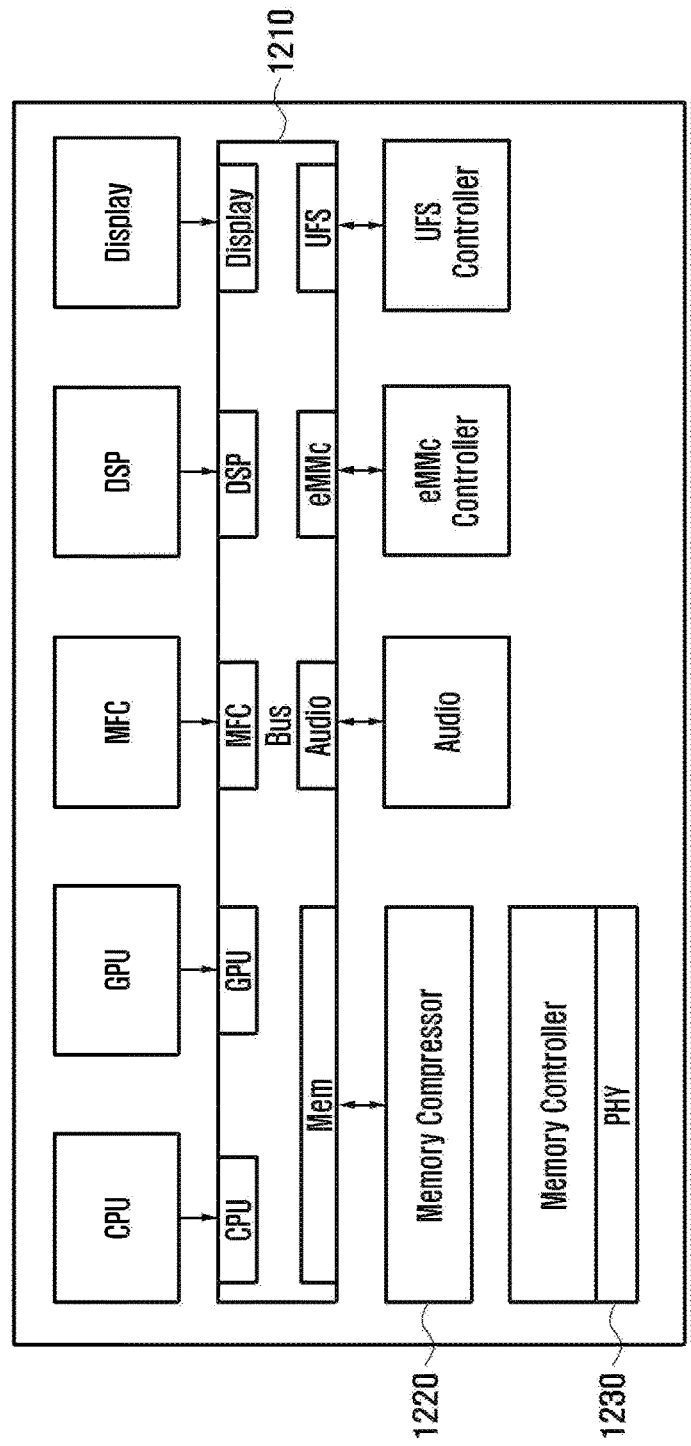

FIG. 10 illustrates a structure of a system-on-chip (SoC) for hardware accelerator-based memory compression according to an embodiment of the present invention, and FIGS. 11 and 12 illustrate other examples of the SoC structure for hardware accelerator-based memory compression according to an embodiment of the present invention. The SoC for hardware accelerator-based memory compression may perform the operations following operation S320 of FIG. 3.

Referring to FIG. 10, in designing a compression system, the compressing performer may be changed according to flexibility, cost, a service rate, power consumption, or the like. A CPU 1010 may compress the memory in consideration of the flexibility and the cost, and a compression-dedicated hardware accelerator 1030 may be designed in order to improve the service rate and reduce the power consumption. In addition, if necessary, the CPU 1010 and the hardware accelerator 1030 may split the memory and may simultaneously compress the same.

Referring to FIGS. 10 to 12, the hardware accelerator according to the present invention may be implemented in various ways. That is, as shown in FIG. 10 [S1], a memory compressor 1030 may be disposed outside a bus 1060 and a memory controller 1070. In addition, as shown in FIG. 11, the memory compressor 1115 may be disposed inside the memory controller 1110. In addition, the memory compressor 1220 may be disposed between the bus 1210 and the memory controller 1230 as shown in FIG. 12. The configurations provided in FIGS. 10 to 12 are only examples of the SoC for the hardware accelerator-based memory compression according to the present invention, and the scope of the present invention is not limited thereto.

Figure 13:
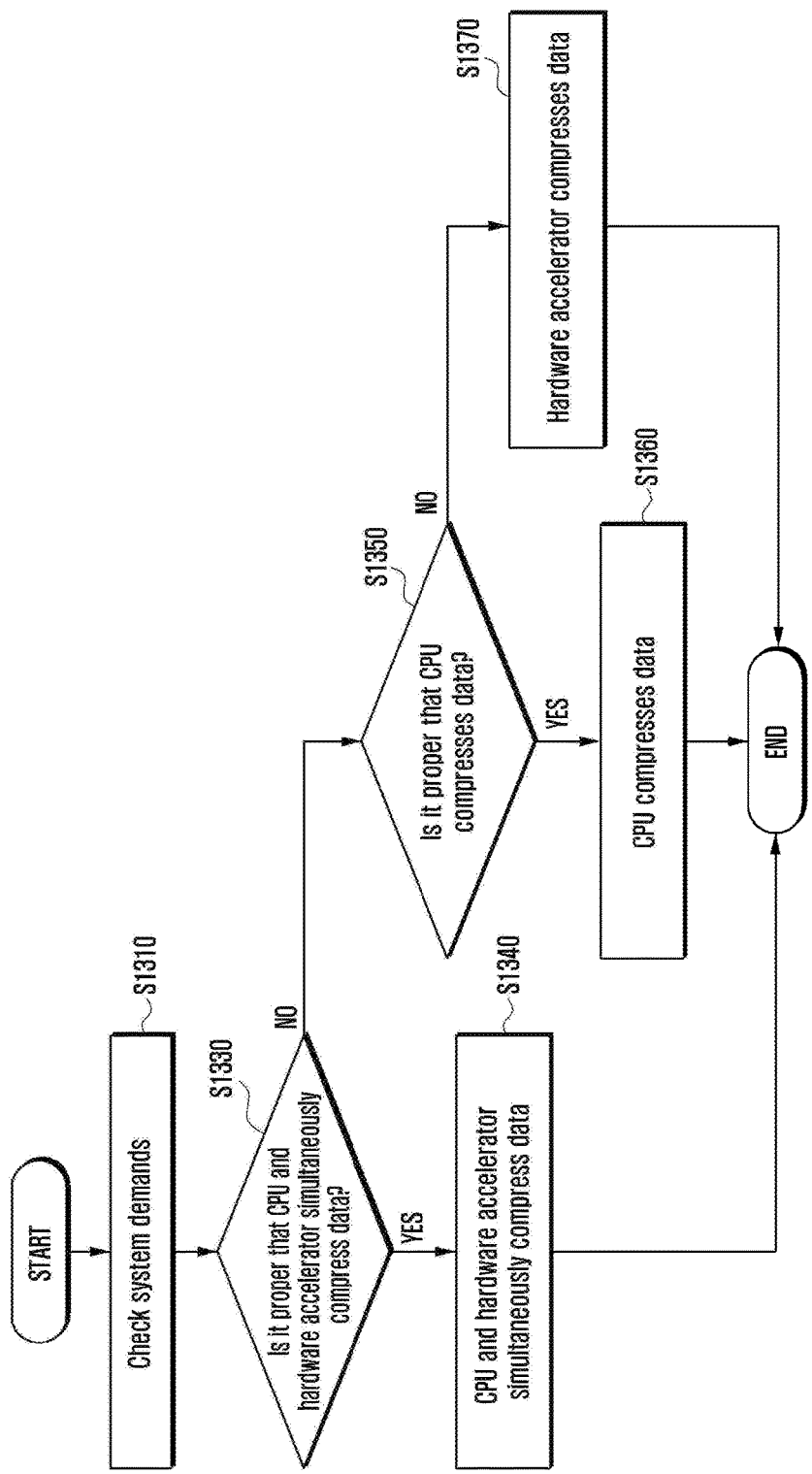
FIG. 13 is a flowchart illustrating a method for selecting a memory compression performer according to an embodiment of the present invention.

FIG. 13 shows the operation S320 of FIG. 3 in detail. More specifically, FIG. 13 is a flowchart illustrating a method for selecting a memory compression performer according to an embodiment of the present invention.

As described above, in the embodiment of the present invention, at least one of the compressing performers, the compression unit, and the compression process may be selected based on the system demands. According to this, the electronic device may check the system demands in order to select the compressing performer in operation S1310.

The checking of the system demands may be conducted by the CPU (or the controller) in the electronic device. The CPU may check, as the system demands, features of applications, the available memory size, the memory size to be secured, a required service rate/compression ratio/power consumption/latency, the CPU operation status, the battery status, the traffic status, or the like. For example, as a result of the checking, if the remaining battery power is less than a threshold, the hardware accelerator of low power consumption may be selected as the compressing performer.

In operation 1330, the CPU (or the controller) may determine whether or not it is preferable that the CPU and the hardware accelerator simultaneously compress the memory as the compressing performers.

If it is preferable that the CPU and the hardware accelerator simultaneously compress the memory in operation S1330, the electronic device may proceed to operation S1340, and then the CPU and the hardware accelerator simultaneously perform the compression. If it is preferable that either the CPU or the hardware accelerator compresses the memory in operation S1330, the electronic device may proceed to operation S1350 to determine which one is appropriate as the compressing performer.

Meanwhile, although operation S1330 and operation S1350 are separated in FIG. 13, the determination on the selection of both the CPU and the hardware accelerator as the compressing performers, and the determination on which of the CPU and the hardware accelerator is suitable for the compressing performer may be made through a single operation.

Subsequently, in operation S1350, the CPU (or controller) may determine which of the CPU and the hardware accelerator is suitable for the compressing performer. For example, the CPU may determine that the CPU is appropriate in the case of a high flexibility, a high cost, or a sufficient battery power more than a predetermined value. In addition, the CPU (or controller) may determine that the hardware accelerator is appropriate in the case where a high service rate or low power consumption is required according to the system demands, or utilization of the CPU is quite low. In addition, the CPU (or controller) may determine that it is proper that both the CPU and the hardware accelerator simultaneously perform the compression in the case where a very high service rate is required according to the system demands.

For example, when the CPU is required to execute the applications, that is, when the CPU is to be used for executing the applications, such as, for example, a gallery application for displaying images, a movie-player application, or a web surfing application, the hardware accelerator may be selected as the compressing performer.

In addition, when a short latency is required, both the CPU and the hardware accelerator may be selected as the compressing performers for rapid compression.

When the CPU is selected as the compressing performer in operation S1350, the electronic device may proceed to operation S1360. In operation S1360, the CPU may compress the memory data requested to be compressed. When the hardware accelerator is selected as the compressing performer in operation S1350, the electronic device may proceed to operation S1370. In operation S1370, the hardware accelerator may compress the memory data requested to be compressed.

Now, according to an embodiment of the present invention, the operation of selecting the compressing performer according to the service rate required by the system will be described. If the service rate required by the system is higher than the maximum service rate of the hardware accelerator, it may be determined that the CPU and the hardware accelerator simultaneously perform the compression (operation S1330). In this case, the CPU and the hardware accelerator may simultaneously perform the compression in the next operation.

According to another embodiment, when the remaining battery power is less than 50%, or when the utilization of the CPU is less than 10%, it may be determined that the hardware accelerator is to perform the compression in order to reduce the power consumption and convert the CPU into the idle state, according to a predetermined configuration of the system. In this case, the hardware accelerator may perform the compression. On the contrary, when the remaining battery power is more than 50%, or when no hardware accelerator is adopted due to a limited cost, the CPU may perform the compression.

The determination according to the system demands is only an example of the embodiments of the present invention, and the scope of the present invention is not limited thereto. It is obvious that the condition for each item of the system demands may vary with the systems.

Now, a method of determining the compression unit according to an embodiment of the present invention will be described with reference to FIGS. 14 to 17. FIGS. 14 to 17 show the detailed operation of determining the memory compression unit in operation S330 of FIG. 3 set forth above.

Figure 14:
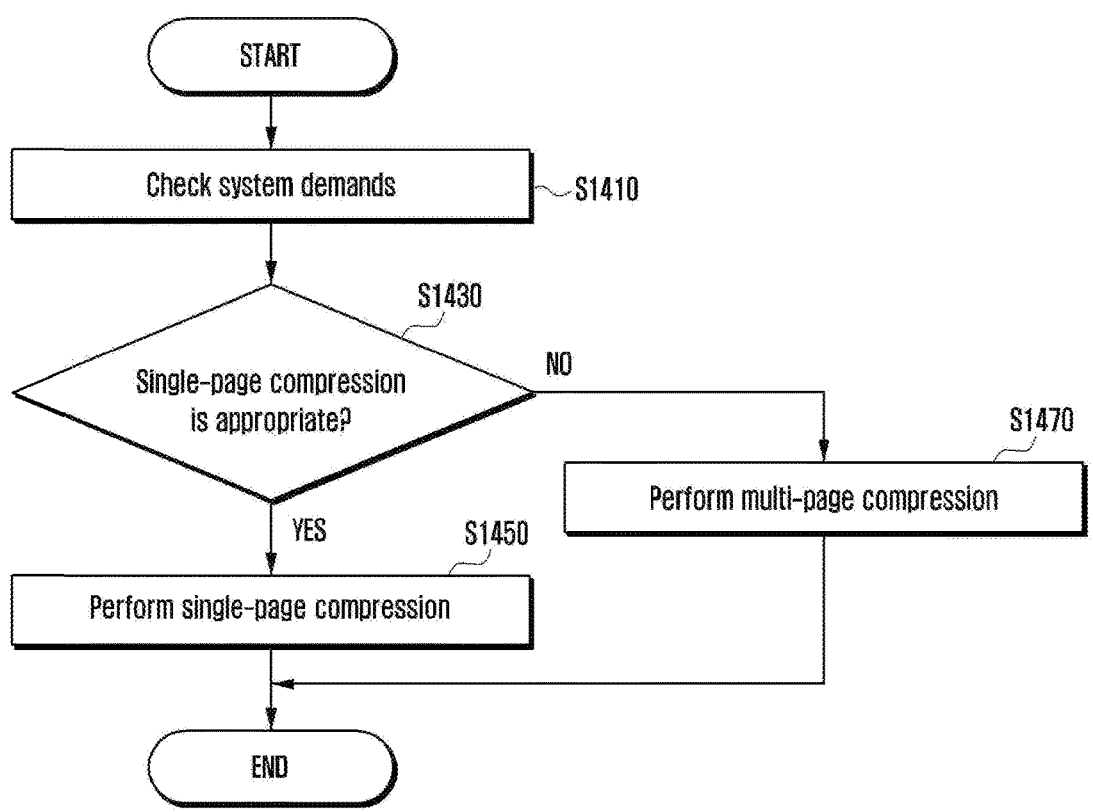
FIG. 14 is a flowchart illustrating a method for selecting a memory compression unit according to an embodiment of the present invention.
Figure 15:
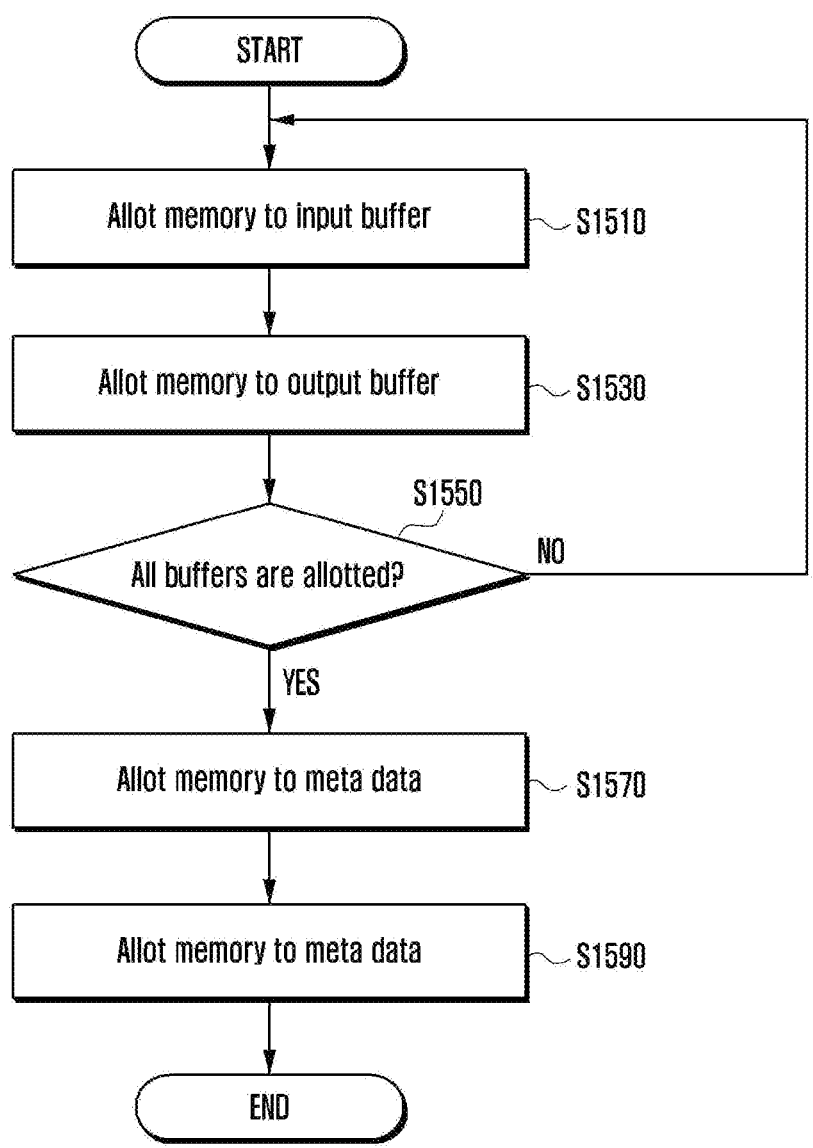
FIG. 15 is a flowchart illustrating a method for selecting a memory compression unit according to an embodiment of the present invention.
Figure 16:
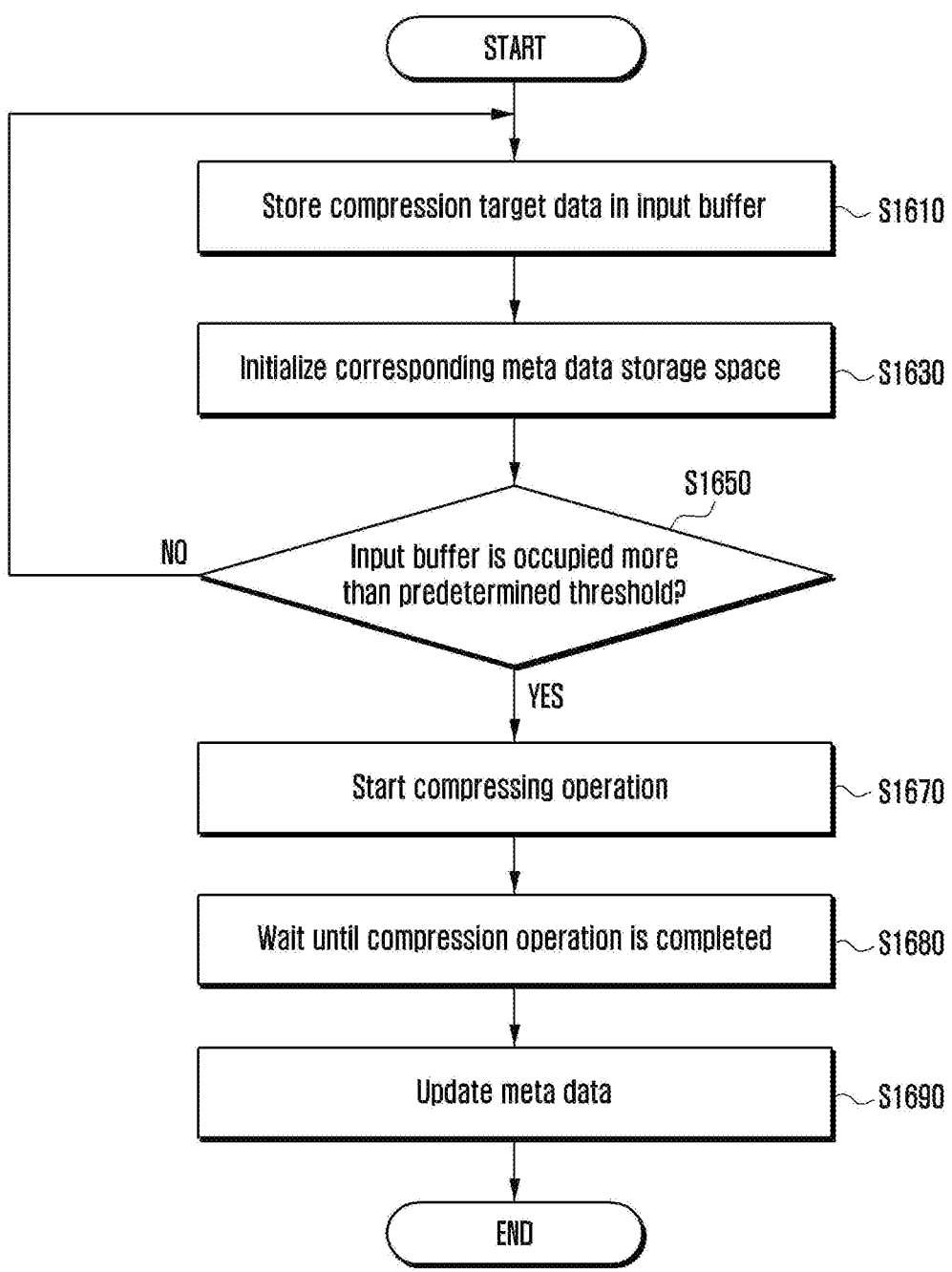
FIG. 16 is a flowchart illustrating the operation of a multi-page compression system according to an embodiment of the present invention.

FIG. 14 is a flowchart illustrating a method for selecting the memory compression unit according to an embodiment of the present invention, and FIG. 15 is a flowchart illustrating a method for selecting the memory compression unit according to an embodiment of the present invention. In addition, FIG. 16 is a flowchart illustrating the operation of a multi-page compression system according to an embodiment of the present invention, and FIG. 17 illustrates features of a hardware accelerator-based compression system according to an embodiment of the present invention.

Referring to FIG. 14, the electronic device including a memory may check the system demands in operation S1410. For example, the system demands may be the input buffer size N, the latency, the available memory space, or the like. However, the system demands are not limited thereto.

In operation S1430, the CPU (or controller) may determine whether or not the single-page compression is appropriate or the multi-page compression is appropriate as the compression unit. The CPU (or controller) may determine that the single-page compression is appropriate in the case of a short period of latency or an insufficient available memory, or when a multimedia streaming service application is in progress. In addition, in the case of a sufficient available memory, the multi-page compression may be determined to be appropriate. The determination condition is not limited thereto.

When the single-page compression is determined to be appropriate in operation S1430, the electronic device may proceed to S1450 to perform the single-page compression. When the multi-page compression is determined to be appropriate in operation S1430, the electronic device may proceed to S1470 to perform the multi-page compression.

The determination in operation S1430 may be made as follows. For example, when a short latency (an index showing how fast the result of the memory compression comes out), which is a kind of pilot-run for checking the compression system, is required, the single-page compression may be preferred.

In addition, the single-page compression may be preferred according to the features of the application, for example, in the case of a heavy traffic due to an application in progress, which uses a multimedia streaming service. In detail, the heavy traffic means a lot of works to be processed. Although the multi-page compression can be made at a high speed, it requires a lot of works to be processed, so the multi-page compression is not suitable for the heavy traffic. Although the single-page compression is preferred for the heavy traffic in the embodiment, the present invention is not limited thereto.

In addition, the CPU (or controller) may determine the compression unit according to the input buffer size. For example, the CPU (or controller) may configure so that the compression is made by one page in the case of N=1 (single-page), and the compression is made by several pages in the case of N≥1 (multi-page).

In addition, the single-page compression requires a relatively small input buffer size N, so it is appropriate for the case in which the available memory of the system is less than a predetermined value (e.g., 20%) of the total memory (the available memory value is not limited thereto, and it may be different according to the configuration of the user or the electronic device). On the contrary, the multi-page compression is appropriate for the case in which the available memory of the system is more than a predetermined value (e.g., 20%) of the total memory. However, the determination reference of each item may be different according to the systems.

In addition, when the compressing performer is related to the compression unit, the hardware accelerator is appropriate for the multi-page compression, and the CPU is appropriate for the single-page compression. As described above, although the compression unit may be affected by the compressing performer, the present invention is not limited thereto, and the operation of determining the compressing performer and the compression unit may be independent from each other.

Next, the operation of initializing the multi-page compression system will be described with reference to FIG. 15. In operation S1510, the CPU (or controller) may allot the memory to the input buffer. The input buffer is a space for storing the pages to be compressed, which may be a kind of virtual RAM disk. In addition, the input buffer size "N" refers to the number of pages to be stored, which may vary. The input buffer size may be determined by the number of pages to be stored, and the size thereof.

Next, in operation S1530, the CPU (or controller) may allot the memory to the output buffer. The output buffer may be a space for storing the compressed results in a page unit, and the size thereof may vary depending on the input buffer size N. The allocation of the memory to the output buffer may be conducted prior to operation S1510.

The CPU (or controller) may determine whether or not all of the buffers have been allotted with the memory in operation S1550. If not all buffers have been allotted, the CPU (or controller) may return to operation S1510 to allot the memory to each buffer. When it is determined that all of the buffers have been allotted, CPU (or controller) may allot the memory for meta data in operation S1570.

The compression information storage space may store the meta data. The compression information storage space may be a space for storing information on the pages, which can be managed by means of an intrinsic index for separating the pages to be compressed from the compressed pages. In addition, the compressed information storage space may include a position of a buffer in which a corresponding page is stored, and an address of the position in the buffer. It may include a size for the compressed pages.

In operation S1590, the CPU (or controller) may select the compression process type.

Now, the operation of the multi-page compression system will be described with reference to FIG. 16.

In operation S1610, the CPU (or controller) may make a control to store compression-targeted data in the input buffer. In operation S1630, the CPU (or controller) may initialize the meta data space corresponding to the input buffer to store the compression-targeted data.

In operation S1650, the CPU (or controller) may determine whether or not the compression is required according to the input buffer status. For example, when the input buffer space is full or the amount of data in the input buffer exceeds a predetermined threshold, the CPU (or controller) may determine to start the memory compression.

The CPU (or controller) may start to compress the data stored in the input buffer in operation S1670. In the case where the CPU compresses the data, the CPU may not transmit separate signals. The hardware accelerator may receive an instruction for the compression to thereby compress the data. The hardware accelerator may receive the instruction for the compression from the CPU. The CPU and/or the hardware accelerator may perform the compression. The CPU and/or the hardware accelerator may compress the pages stored in the input buffer by each page to thereby store the same in the output buffer. In operation S1680, the compressing operation is in progress. During the compression, the CPU may be on standby without storing the additional pages to be compressed in the input buffer. After the hardware accelerator completes the compression, the CPU may resume storing the data to be compressed in the input buffer.

In operation S1690, information on the compressed pages may be stored. The information on the compressed pages may be updated to be stored in the meta data. In addition, information on the pages on standby for the compression and the pages having failed to be compressed may be updated in the meta data. In general, the OS manages the memory space by a page unit, so the compression by each page may facilitate the decompression of the memory.

Next, the features of a hardware accelerator-based multi-page compression system will be described with reference to FIG. 17.

The CPU may store N pages to the maximum in the input buffer, and may perform the compression by each page through the hardware accelerator. Accordingly, the CPU may be in the idle state for a $N/\mu$ time, so the power consumption can be reduced. The input buffer size N may be dynamically determined according to the idle time of the CPU, the system available memory size, the service rate, or the like.

In addition, the CPU may not store the additional pages to be compressed in the corresponding input buffer while the hardware accelerator compresses the pages stored in the input buffer, and after the completion of the compression by the hardware accelerator, the CPU may resume storing the pages. This can reduce interactions between the CPU and the hardware accelerator to thereby lower the communication overhead. Meanwhile, a plurality of input buffers and output buffers may be used, and according to this, the CPU may reduce a blocking phenomenon by which the pages to be compressed cannot be stored and to be on standby.

Moreover, the memory area of the input buffer and the output buffer may be allotted to spaces which are physically consecutive, so the hardware accelerator can perform the direct memory access (DMA) operation by only a start address and size information of the corresponding buffer area. According to this, the data transmission speed may be improved and the hardware structure may be simplified.

Hereinafter, the compressing process in operation S340 of FIG. 3 will be described.

Here, the relationship between system parameters necessary for understanding the present invention will be described prior to the description of the compressing process according to an embodiment of the present invention.

Figure 18:
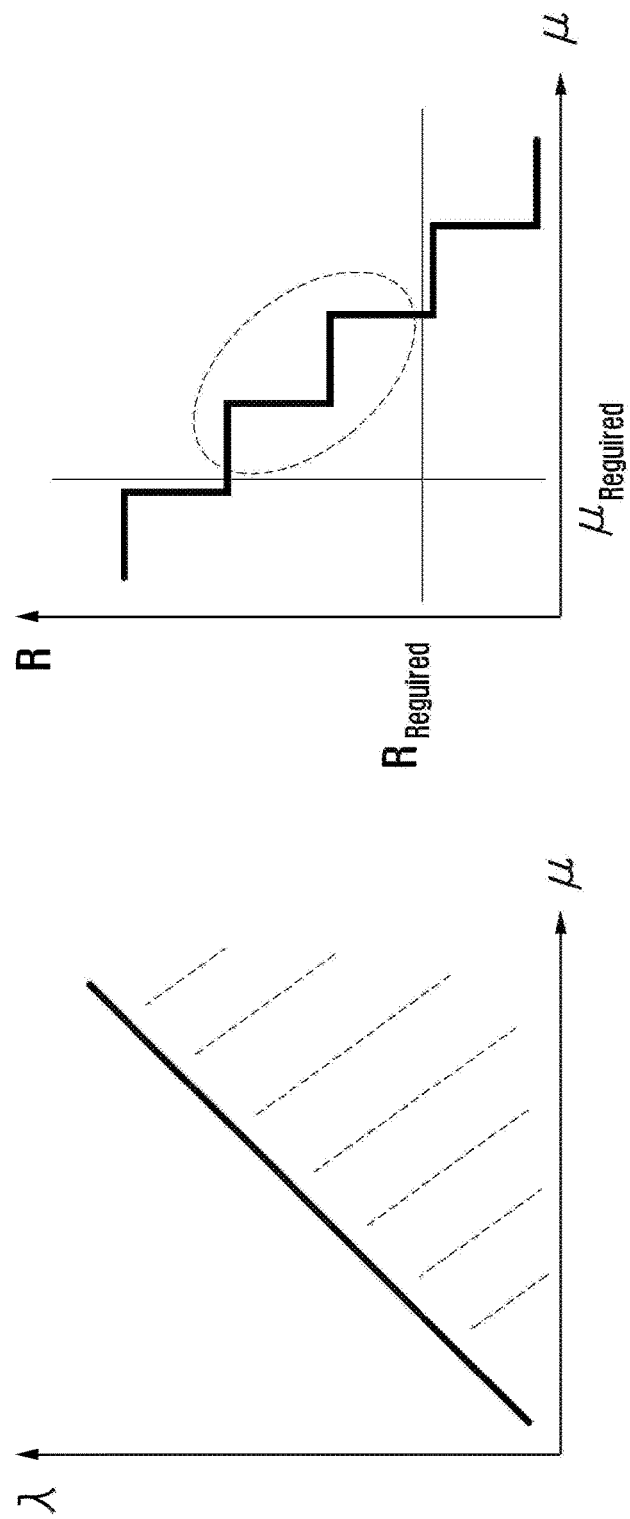
FIG. 18 illustrates the relationship between system parameters according to an embodiment of the present invention.

FIG. 18 illustrates the relationship between system parameters according to an embodiment of the present invention.

FIG. 18 shows the relationship between system parameters, i.e., the arrival rate λ, the service rate μ, and the compression ratio R. λ is an index for an arrival rate, which means an average speed at which the pages to be compressed are generated from the OS. μ is an index for a compression service rate, which means an average service rate. R means a compression ratio.

Referring to a graph showing the relationship between λ and μ, in order to keep the system stable, the service rate μ should be greater than the arrival rate λ, so the service rate μ is proportional to the arrival rate λ. If the service rate μ of the CPU or the hardware accelerator is not faster than the arrival rate λ, at which the pages to be compressed are generated, the pages to be compressed may not be processed. Thus, the service rate μ is required to be faster than the arrival rate λ of the pages to be compressed for a stable management of the system.

On the contrary, referring to a graph showing the relationship between μ and R, the service rate μ is in inverse proportion to the compression ratio R. That is, the faster the service rate μ is, the lower the compression ratio R is, and vice versa.

Figure 19:
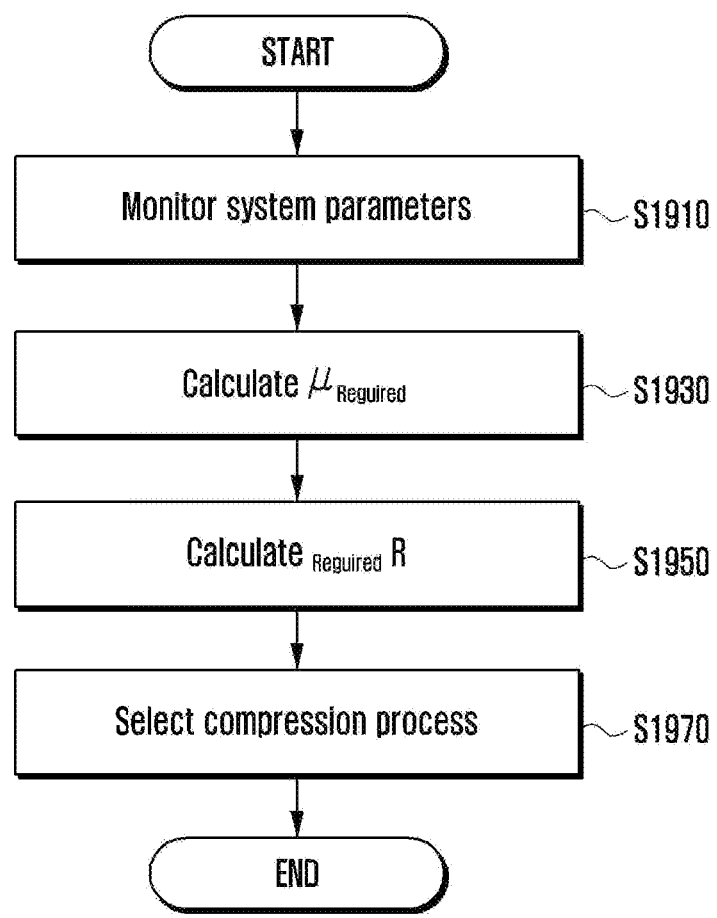
FIG. 19 is a flowchart illustrating the compression process according to an embodiment of the present invention.

FIG. 19 is a flowchart illustrating the compression process according to an embodiment of the present invention.

Referring to FIG. 19 shows the operation of selecting a compression algorithm using the arrival rate λ, the service rate μ, and the compression ratio R, and performing the compression according to the selected algorithm.

The memory compressing apparatus may obtain system parameters in operation 1910. The system parameters may include the arrival rate λ, the service rate μ, and the compression ratio R.

In operation 1930, the memory compressing apparatus may calculate the required service rate ($\mu_{Required}$). The required service rate ($\mu_{Required}$) may be calculated through the arrival rate λ of the data to be compressed or the required compression time.

In operation S1950, the memory compressing apparatus may calculate a required compression ratio ($R_{required}$). The required compression ratio ($R_{Required}$) may be calculated according to the available memory space of the system, the memory size to be secured by the compression, the required compression ratio, or the like. Operation S1930 and operation S1950 may be performed in reverse order.

In operation S1970, the memory compressing apparatus may determine a compression process selection range through the required service rate ($\mu_{Required}$) and the required compression ratio ($R_{required}$), which are obtained in the operation above. In addition, a compression algorithm may be determine based on one of required service rate ($\mu_{Required}$) and the required compression ratio ($R_{Required}$) according to priority thereof.

The compression algorithm may be selected from at least one of the compression algorithms, based on at least one of the parameters set forth above. For example, the memory compressing apparatus may store a plurality of compression algorithms, e.g., 10 algorithms. The compression algorithms may include a "zip" format, a "tar" format, or a "rar" format, but not limited thereto.

If the service rate is given the priority according to the system parameters, the memory compressing apparatus may select a compression algorithm of the fastest service rate from among the plurality of algorithms, and may perform the compression process. For example, if the "zip" format is the algorithm having the fastest service rate among the disclosed compression algorithms, the memory compressing apparatus may select the "zip" algorithm as the current compression algorithm.

For another example, if the compression ratio is determined to be prioritized according to the system parameters, the memory compressing apparatus may select a compression algorithm having a highest compression ratio among the plurality of algorithms, and may perform the compression process. For example, if the "rar" format is the algorithm having the highest compression ratio among the disclosed compression algorithms, the memory compressing apparatus may select the "rar" algorithm as the current compression algorithm.

In addition, according to an embodiment of the present invention, the algorithm may be changed in consideration of a change in the service rate μ or the compression ratio R according to the data pattern of the input page.

In addition, the used memory size, the required memory size, the memory access pattern, and the data pattern may be changed according to the features of the application in progress. Accordingly, considering such features, the adequate $\mu_{Required}$ and $R_{Required}$ may be calculated to thereby determine the compression process. Furthermore, the compression process may be changed through checking the result of the compression.

The compression algorithm may be properly selected according to the compressing performer. For example, in the case of the hardware accelerator for the compression, the algorithm may be selected from among a candidate group of algorithms that are suitable for the hardware accelerator.

Now, the embodiment for determining the compression ratio and the service rate will be described.

A high compression ratio may be preferred in the case of insufficient available memory space, a low utilization of the CPU, and an application that uses a big memory, such as games, image/movie-players, in progress. On the contrary, a high service rate may be preferred when the memory needs to be promptly secured.

For example, when the available memory space is less than 30% of a total memory, or the utilization of the CPU is less than 20%, the process of the highest compression ratio may be selected. In addition, when the available memory space is between 30% and 40%, or the utilization of the CPU is between 20% and 30%, the process of the next highest compression ratio may be selected. Likewise, the compression ratio may be configured according to the available memory size and the utilization of the CPU, as described above, and the compression corresponding thereto may be performed.

For example, when the system requires the memory of more than 200 MB within 1 second, the process of the fastest service rate may be selected. The available memory space, the processor utilization, the required service rate, and the compression ratio, which are described in the present embodiment, are only examples of the present invention, and the scope of the present invention is not limited thereto. In addition, a reference value of each item may vary with the systems.

Figure 20:
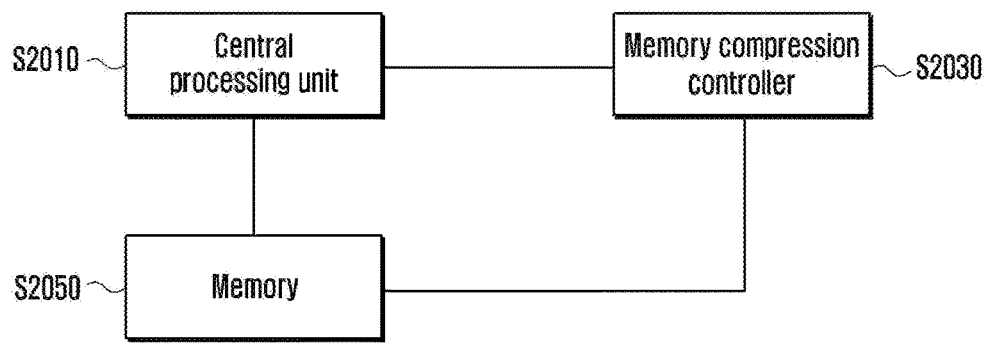
FIG. 20 is a block diagram of a memory compressing apparatus according to an embodiment of the present invention.

FIG. 20 is a block diagram of a memory compressing apparatus according to an embodiment of the present invention.

Referring to FIG. 20, the memory compressing apparatus 2000 may include a central processing unit 2010 [S2] for controlling overall operations of the memory compressing apparatus 2000, a memory compression controller 2030 for compressing the memory, and a memory 2050 for storing data.

In the embodiment, the central processing unit 2010 may make a control to select one of the single-page compression, or the multi-page compression as a compression unit, based on the system demands.

According to the embodiment, the central processing unit 2010 may make a control to identify system demands, to select at least one compression element from a compressing performer, a compression unit, and a compression process, which are used for compressing data stored in the memory, based on the identified system demands, and to perform the memory compression according to the selected compression element.

According to the embodiment, the central processing unit 2010 may make a control to select at least one of the central processing unit 2010 or the hardware accelerator 2030 as the compressing performer, based on the system demands. When the hardware accelerator is selected as the compressing performer, the central processing unit 2010 may make a control to store pages to be compressed in an input buffer, to store compressed pages in an output buffer, and to store compression-related information including the compression result in a compression information storage space, and the hardware accelerator compresses the stored pages in the input buffer.

Further, according to the embodiment, the central processing unit 2010 may make a control to makes a control to select one of a single-page compression or a multi-page compression as the compression unit, based on the system demands. When the multi-page compression is selected as the compression unit, the central processing unit 2010 may make a control to select the hardware accelerator as a compressing performer. In addition, when the multi-page compression is selected as the compression unit, the central processing unit 2010 may make a control to store the pages to be compressed in the input buffer, and may determine whether or not the amount of the pages to be compressed exceeds a predetermined threshold. If the amount of the pages to be compressed is determined to exceed the predetermined threshold, the central processing unit 2010 may make a control to compress the pages stored in the input buffer.

In addition, according to an embodiment of the present invention, the central processing unit 2010 may configure the required service rate and the required compression ratio, based on the system demands, and may select the compression process for compressing the pages according to the configured service rate and compression ratio.

The memory compression controller 2030 may be referred to as a hardware accelerator. The memory compression controller 2030 may compress the data stored in the memory. The memory compression controller 2030 may be a dedicated controller for the memory compression.

According to an embodiment of the present invention, the memory compression controller 2030 may be selected as a compressing performer to compress the pages stored in the input buffer.

Although the functions of the central processing unit 2010 and the hardware accelerator 2030 are described in the embodiment above, the functions and the operation thereof are not limited thereto, and the central processing unit 2010 and the hardware accelerator 2030 may perform the operations of the embodiments in FIGS. 1 to 15.

Figure 21:
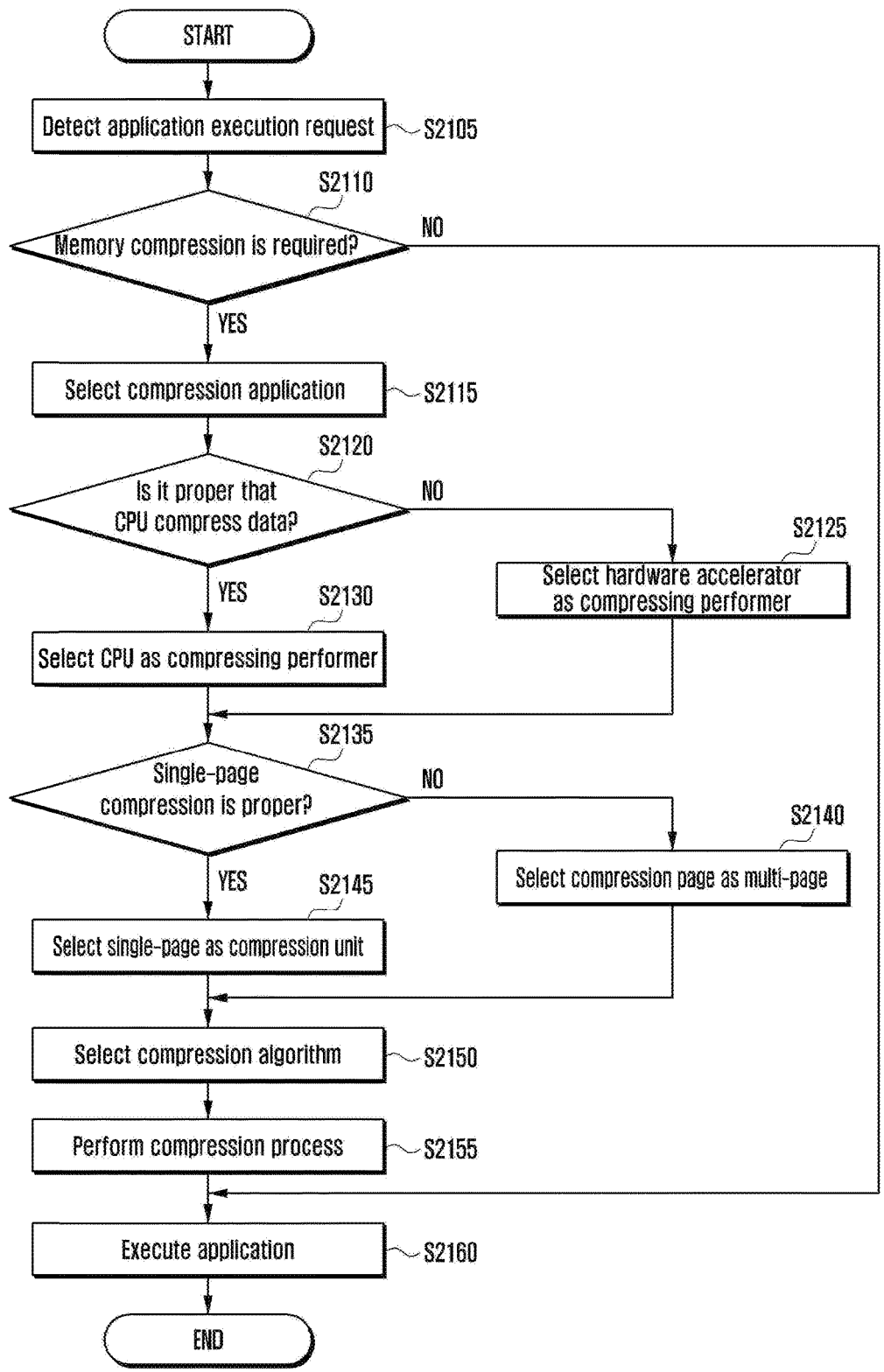
FIG. 21 is a flowchart illustrating another of various embodiments of the present invention.

FIG. 21 is a flowchart illustrating another of various embodiments of the present invention.

FIG. 21 illustrates a process from detection of an application execution request to the final execution as an example.

First, the electronic device may detect the receipt of the application-execution request in operation S2105. Then, the electronic device may determine whether or not the memory compression is required in operation S2110. The criteria of the determination may be variously configured as follows. If the memory size required for the execution of the application is more than the available memory size, or the available memory size is decreased below a predetermined value, the compression may be performed.

When the compression is determined to be required, the electronic device may proceed to operation S2115 to select the application to be compressed. In addition, the electronic device may select the compressing performer in or after operation S2120. As described above, the compressing performer may be determined according to the CPU operation status, the required service rate, power consumption, the battery status, or the like, and when the CPU is in the idle state or the remaining battery power is lower than a predetermined value, the hardware accelerator may perform the compression.

If it is determine that the CPU is not appropriate for the compressing performer in operation S2120, the electronic device may select the hardware accelerator as the compressing performer in operation S2125. Contrarily, if it is determine that the CPU is appropriate as the compressing performer, the electronic device may proceed to operation S2130 to select the CPU as the compressing performer.

In addition, the electronic device may determine the compression unit in or after operation S2135. In this case, the compression unit may be affected by the compressing performer, the amount of traffic, or the like. When the hardware accelerator performs the compression, or in the case of a heavy traffic, the compression may be performed by a multi-page unit.

The electronic device may determine whether or not the single-page compression is appropriate in operation S2135. When the single-page compression is determined to be appropriate, the electronic device may proceed to operation S2145 to select the single-page compression as the compression unit. On the contrary, when the single-page compression is determined not to be appropriate, the electronic device may proceed to operation S2140 to select the multi-page compression as the compression unit.

Subsequently, the electronic device may select the compression algorithm in or after operation 2150. The compression algorithm may be selected from a group of available algorithms in consideration of the required service rate and the required compression ratio. When a high service rate is required, the algorithm having a high service rate and a low compression ratio may be selected.

When the compression algorithm is selected in operation 2150, the electronic device may perform the compression, based on the selected compressing performer, the compression unit, and the compression algorithm in operation 2155.

According to an embodiment of the present invention, the sequence and the combination of the selection operations are only examples, and may be modified.

After the completion of the operations above, the electronic device may execute the requested application.

The embodiments disclosed in the present specifications and drawings were provided merely to readily describe and to help a thorough understanding of the present invention but not intended to limit the scope of the present invention. Therefore, it should be construed that, in addition to the embodiments disclosed herein, all modifications and changes or modified and changed forms derived from the technical idea of the present disclosure fall within the scope of the present disclosure.

The invention claimed is:

1. A method for compressing data in a memory in an electronic device, the method comprising:
   identifying a request for executing a first application;
   determining whether a compression of data in the memory is required for the execution of the first application;
   in response to a determination that the compression is required for the execution of the first application, selecting an application in progress in a background of the electronic device based on a correlation with the first application; and
   compressing data corresponding to the selected application and executing the first application.

2. The method of claim 1, further comprising:
   identifying a request for executing a second application;
   determining whether the second application is in progress in the background;
   if the second application is not in progress in the background, determining whether the compression is required for the execution of the second application;
   if the compression is required, compressing data corresponding to an application in progress in a background of the electronic device, and executing the second application; and
   if the compression is not required, executing the second application.

3. The method of claim 2, further comprising:
   if the second application is in progress in the background, determining whether the second application has been compressed; and
   if the second application has been compressed, decompressing the compressed second application, and executing the second application.

4. The method of claim 3, further comprising, if the second application has not been compressed, re-executing the second application.

5. The method of claim 3, the decompressing further comprising:
   if the second application has been compressed, determining whether the compression is required for the execution of the second application;
   if the compression is required, compressing data corresponding to the application in progress in the background of the electronic device, and executing the second application; and
   if the compression is not required, decompressing the compressed second application, and executing the second application.

6. The method of claim 1, further comprising determining, when a memory size required for the execution of the application is greater than an available memory size according to at least one application in progress in the background, that the compression is determined to be required.

7. The method of claim 1, further comprising selecting the application to be compressed according to at least one of a priority list for compression, a correlation with the first application, or a frequency of use of the application.

8. An electronic device comprising:
   a memory; and
   a controller configured to control to:
      identify a request for executing a first application,
      determine whether a compression of data in the memory is required for the execution of the first application,
      in response to a determination that the compression is required for the execution of the first application, select an application in progress in a background of the electronic device based on a correlation with the first application, and
      compress data corresponding to the selected application and execute the first application.

9. The electronic device of claim 8, wherein the controller is further configured to control to:
   detect a request for executing the second application,
   determine whether the second application is in progress in the background,
   if the second application is not in progress in the background, determine whether the compression is required for the execution of the second application,
   if the compression is required, compress data corresponding to an application in progress in a background of the electronic device and execute the second application, and
   if the compression is not required, execute the second application.

10. The electronic device of claim 9, wherein the controller is further configured to:
    control, if the second application has been compressed, to determine whether the compression is required for the execution of the second application,
    if the compression is required, compress data corresponding to an application in progress in a background of the electronic device, decompress the second application, and execute the second application, and
    if the compression is not required, decompress the compressed second application, and execute the second application.

11. The electronic device of claim 9, wherein the controller is further configured to:
    control, if the second application is in progress in the background, to determine whether the second application has been compressed, and
    if the second application has been compressed, decompress the compressed second application, and executing the second application.

12. The electronic device of claim 11, wherein the controller is further configured to control, if the second application has not been compressed, to re-execute the second application.

13. The electronic device of claim 8, wherein, the controller is further configured to determine that the compression is required when a memory size required for the execution of the application is greater than an available memory size according to at least one application in progress in the background.

14. The electronic device of claim 8, wherein the controller is further configured to select the application to be compressed according to at least one of a priority list for compression, the correlation with the first application, or the frequency of use of the application.

* * * * *